(12) United States Patent
Sundareswara et al.

(10) Patent No.: US 11,907,833 B2
(45) Date of Patent: Feb. 20, 2024

(54) SYSTEM AND METHOD FOR GENERATING AN AIRCRAFT FAULT PREDICTION CLASSIFIER

(71) Applicant: THE BOEING COMPANY, Chicago, IL (US)

(72) Inventors: Rashmi Sundareswara, Topanga, CA (US); Franz David Betz, Renton, WA (US); Tsai-Ching Lu, Thousand Oaks, CA (US)

(73) Assignee: THE BOEING COMPANY, Arlington, VA (US)

( * ) Notice: Subject to any disclaimer, the term of this patent is extended or adjusted under 35 U.S.C. 154(b) by 306 days.

(21) Appl. No.: 16/201,953

(22) Filed: Nov. 27, 2018

(65) Prior Publication Data
US 2020/0167640 A1    May 28, 2020

(51) Int. Cl.
*G06N 3/08* (2023.01)
*G06N 20/10* (2019.01)
*G06N 7/01* (2023.01)

(52) U.S. Cl.
CPC .............. *G06N 3/08* (2013.01); *G06N 7/01* (2023.01); *G06N 20/10* (2019.01)

(58) Field of Classification Search
CPC ........... G06N 3/08; G06N 20/10; G06N 7/005
See application file for complete search history.

(56) References Cited

U.S. PATENT DOCUMENTS

| | | | |
|---|---|---|---|
| 10,657,736 B2 | 5/2020 | Sundareswara et al. | |
| 2007/0288409 A1 | 12/2007 | Mukherjee et al. | |
| 2009/0228160 A1* | 9/2009 | Eklund | G06F 11/008 701/3 |
| 2017/0024649 A1* | 1/2017 | Yan | G06N 3/044 |
| 2017/0031329 A1* | 2/2017 | Inagaki | G05B 13/0265 |
| 2017/0083830 A1* | 3/2017 | Bates | G05B 23/0229 |
| 2017/0293862 A1* | 10/2017 | Kamiya | G01N 29/14 |

(Continued)

OTHER PUBLICATIONS

Xiaoqian Wang, Hao Huang. Directional Label Rectification in Adaptive Graph. Feb. 2018. Thirty-Second AAAI Conference on Artificial Intelligence (AAAI-18). (Year: 2018).*

(Continued)

*Primary Examiner* — Alexey Shmatov
*Assistant Examiner* — Clint Mullinax
(74) *Attorney, Agent, or Firm* — Moore IP Law

(57) ABSTRACT

A method includes receiving input data including a plurality of feature vectors and labeling each feature vector based on a temporal proximity of the feature vector to occurrence of a fault. Feature vectors that are within a threshold temporal proximity to the occurrence of the fault are labeled with a first label value and other feature vectors are labeled with a second label value. The method includes determining, for each feature vector of a subset, a probability that the label associated with the feature vector is correct. The subset includes feature vectors having labels that indicate the first label value. The method includes reassigning labels of one or more feature vectors of the subset having a probability that fails to satisfy a probability threshold and, after reassigning the labels, training an aircraft fault prediction classifier using supervised training data including the plurality of feature vectors and the labels.

20 Claims, 7 Drawing Sheets

(56) References Cited

U.S. PATENT DOCUMENTS

2019/0333294 A1    10/2019   Sundareswara et al.

OTHER PUBLICATIONS

Volponi, et al., Development of an Information Fusion System for Engine Diagnostics and Health Management, The NASA STI Program Office . . . in Profile, NASA/TM—2004-212924, Feb. 2004, 22 pages, https://ntrs.nasa.gov/search.jsp?R=20040040086 2018-10-12T00:10:17+00:00Z.

Smith, et al., Analysis of Spread Spectrum Time Domain Reflectometry for Wire Fault Location, IEEE Sensors Journal, vol. 5, No. 6, Dec. 2005, pp. 1469-1478.

Sundareswara, et al., Interpretable Unsupervised Feature Extraction and Learning of Abnormal System State Transitions in Aircraft Sensor Data, Annual Conference of the Prognostics and Health Management Society 2018, 11 pages.

Kobayashi, et al., Application of a Bank of Kalman Filters for Aircraft Engine Fault Diagnostics, The NASA STI Program Office . . . in Profile, NASA/TM—2003-212526, Aug. 2003, 15 pages, https://ntrs.nasa.gov/search.jsp?R=20030067984 2018-10-11T23:54:14+00:00Z.

Ho, The Random Subspace Method for Constructing Decision Forests, IEEE Transactions on Pattern Analysis and Machine Intelligence, vol. 20, No. 8, Aug. 1998, pp. 832-844.

Ho, Random Decision Forests, AT&T Bell Laboratories, 600 Mountain Avenue, 2C-548C, Murray Hill, NJ 07974, USA, 5 pages.

Lo, et al., Noise-Domain Reflectometry for Locating Wiring Faults, IEEE Transactions on Electromagnetic Compatibility, vol. 47, No. 1, Feb. 2005, pp. 97-104.

Ghidella, et al., Requirements-Based Testing in Aircraft Control Design, The MathWorks, Inc., Natick, MA, 01760, USA, American Institute of Aeronautics and Astronautics, pp. 1-11.

Extended European Search Report for Application No. 19210309.1 dated Apr. 30, 2020, 10 pgs.

Jiang, Weiming et al., "Joint Label Consistent Dictionary Learning and Adaptive Label Prediction for Semisupervised Machine Fault Classification," IEEE Transactions on Industrial Informatics, vol. 12, No. 1, Feb. 2016, pp. 248-256.

Xue, Ya et al., "Classification with Imperfect Labels for Fault Prediction," Data Mining for Service and maintenance, ACM 2 Penn Plaza, Suite 701 New York, NY 10121-0701 USA, Aug. 21, 2011, pp. 12-16.

Ester, Martin et al., "A Density-Based Algorithm for Discovering Cluster in Large Spatial Databases with Noise," Proceedings of the Second International Conference on Knowledge Discovery and Data Mining, (KDD-96), AAAI Press, pp. 226-231.

Lo, Chet et al., "Noise-Domain Reflectometry for Locating Wiring Faults," IEEE Transactions on Electromagnetic Compatability, vol. 47, No. 1, Feb. 2005, pp. 97-104.

Rasmussen, Carl Edward, "The Infinite Gaussian Mixture Model," Advances in Neural Information Processing Systems, 2000, 12, pp. 554-560.

Yan. W., et al. "Jet engine gas path fault diagnosis using dynamic fusion of multiple classifiers," Proceedings of IEEE World Congress on Computational Intelligence.Jun. 1-8, 2008, Hong Kong, doi: 10.I 109/IJCNN.2008.4634008.

Communication pursuant to Article 94(3) EPC for application No. 19210309.1 dated Nov. 11, 2021, pp. 1-8.

Loganathan, Ashokkumaar et al., "An Approach for Behavior Discovery using Clustering of Dynamics," IEEE International Conference on systems, Man and Cybernetics, IEEE, 2008, pp. 872-879.

Canadian Examination and Search Report for Application No. 3,061,041 dated Dec. 13, 2022, pp. 1-5.

Canadian Office Action for Application No. 3,061,041 dated Jun. 29, 2023, 4 pgs.

Japanese Office Action for Application No. 2019-208397 dated Jul. 4, 2023, pp. 1-9.

* cited by examiner

SYSTEM AND METHOD FOR GENERATING AN AIRCRAFT FAULT PREDICTION CLASSIFIER

FIELD OF THE DISCLOSURE

The present disclosure is generally related to generating an aircraft fault prediction classifier.

BACKGROUND

Improvements in technology have led to an increasing number of sensors on board vehicles, such as aircraft, automobiles, ships, drones, rockets, spacecraft, and so forth. These sensors may record data before, during, and after transit of the vehicles. For example, parametric flight data may be recorded by a Flight Data Recorder (FDR), a Quick Access Recorder (QAR), a Continuous Parameter Logging (CPL) System, an Enhanced Airborne Flight Recorder (EAFR), or other types of sensor systems. This sensor data can be used for a variety of purposes, including fault prediction.

One method of performing fault prediction is a model-based method. For example, a physics-based model of an expected operating state of an aircraft can be generated, and sensor data can be compared to the model to predict a fault state. To further illustrate, a rule-based model uses rules generated by a logic table that has access to expected values to determine when a rule is violated (e.g., when a fault is predicted). Some model-based techniques require knowledge of the expected operating state, which may be time-consuming or resource-intensive to determine and may use significant system resources (e.g., storage space and processing resources). Additionally, if the vehicle undergoes maintenance or otherwise changes configuration, the model may no longer represent the operating states of the vehicle due to the changes.

SUMMARY

In a particular implementation, a method includes receiving input data including a plurality of feature vectors. The input data includes sensor data associated with the one or more aircraft. The method includes labeling each feature vector of the plurality of feature vectors based on a temporal proximity of the feature vector to occurrence of a fault. Feature vectors that are within a threshold temporal proximity to the occurrence of the fault are labeled with a first label value and feature vectors that are not within the threshold temporal proximity to the occurrence of the fault are labeled with a second label value. The method includes determining, for each feature vector of a subset of the plurality of feature vectors, a probability that the label associated with the feature vector is correct. The subset includes feature vectors having labels that indicate the first label value. The method includes reassigning labels of one or more feature vectors of the subset, the one or more feature vectors having a probability that fails to satisfy a probability threshold. The method further includes, after reassigning the labels of the one or more feature vectors, training an aircraft fault prediction classifier using supervised training data including the plurality of feature vectors and the labels associated with the plurality of feature vectors. The aircraft fault prediction classier is configured to predict occurrence of a second fault of an aircraft using second sensor data of the aircraft.

In another particular implementation, a system includes a processor and a memory coupled to the processor and storing instructions executable by the processor to perform operations including receiving input data including a plurality of feature vectors. The input data includes sensor data associated with the one or more aircraft. The operations include labeling each feature vector of the plurality of feature vectors based on a temporal proximity of the feature vector to occurrence of a fault. Feature vectors that are within a threshold temporal proximity to the occurrence of the fault are labeled with a first label value and feature vectors that are not within the threshold temporal proximity to the occurrence of the fault are labeled with a second label value. The operations include determining, for each feature vector of a subset of the plurality of feature vectors, a probability that the label associated with the feature vector is correct. The subset includes feature vectors having labels that indicate the first label value. The operations include reassigning labels of one or more feature vectors of the subset, the one or more feature vectors having a probability that fails to satisfy a probability threshold. The operations further include, after reassigning the labels of the one or more feature vectors, training an aircraft fault prediction classifier using supervised training data including the plurality of feature vectors and the labels associated with the plurality of feature vectors. The aircraft fault prediction classier is configured to predict occurrence of a second fault of an aircraft using second sensor data of the aircraft.

In another particular implementation, a computer-readable storage device stores instructions that, when executed by a processor, cause the processor to perform operations including receiving input data including a plurality of feature vectors. The input data includes sensor data associated with the one or more aircraft. The operations include labeling each feature vector of the plurality of feature vectors based on a temporal proximity of the feature vector to occurrence of a fault. Feature vectors that are within a threshold temporal proximity to the occurrence of the fault are labeled with a first label value and feature vectors that are not within the threshold temporal proximity to the occurrence of the fault are labeled with a second label value. The operations include determining, for each feature vector of a subset of the plurality of feature vectors, a probability that the label associated with the feature vector is correct. The subset includes feature vectors having labels that indicate the first label value. The operations include reassigning labels of one or more feature vectors of the subset, the one or more feature vectors having a probability that fails to satisfy a probability threshold. The operations further include, after reassigning the labels of the one or more feature vectors, training an aircraft fault prediction classifier using supervised training data including the plurality of feature vectors and the labels associated with the plurality of feature vectors. The aircraft fault prediction classier is configured to predict occurrence of a second fault of an aircraft using second sensor data of the aircraft.

DETAILED DESCRIPTION

Figure 1:
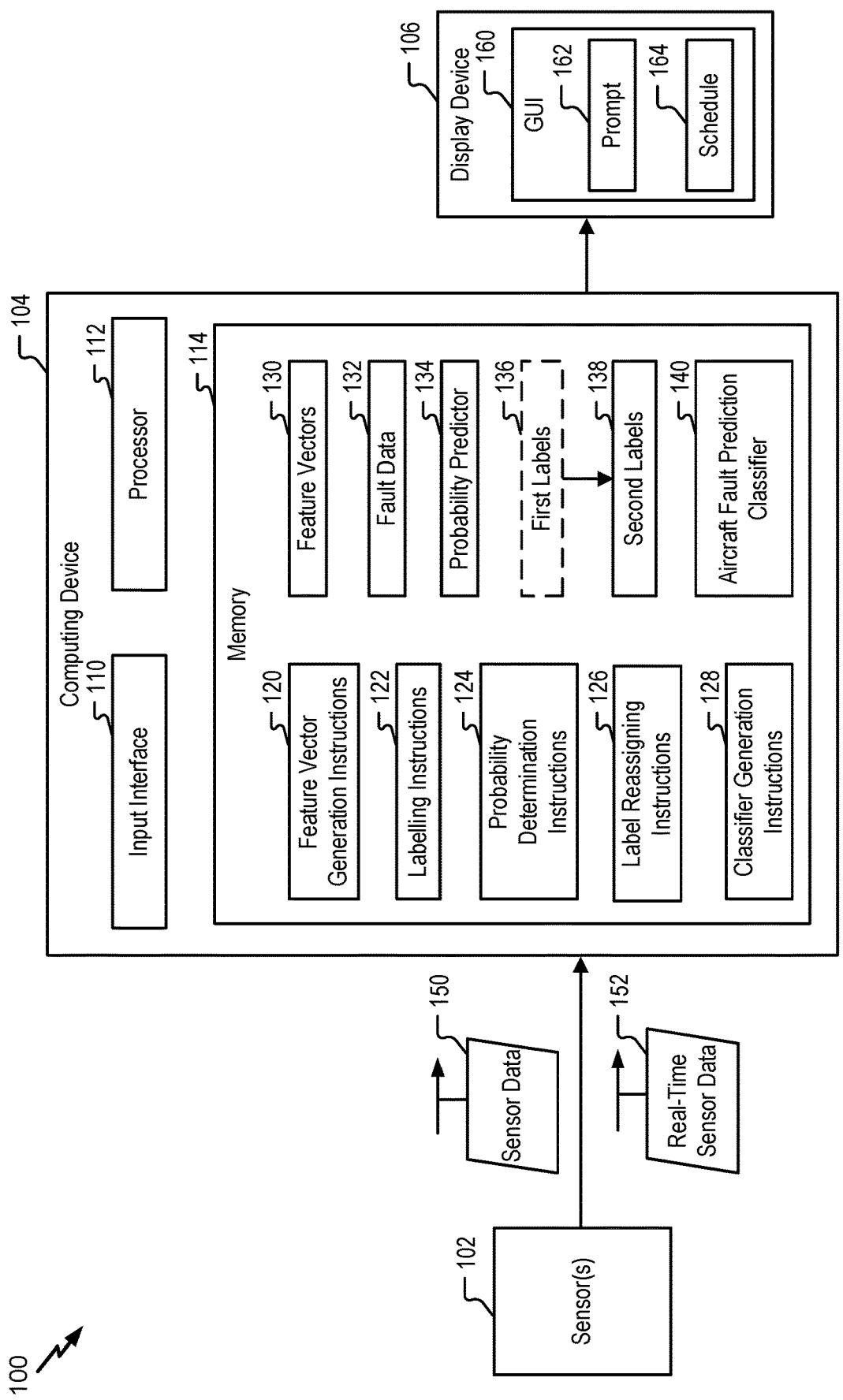
FIG. 1 is a block diagram that illustrates a particular implementation of a system that reassigns labels of feature vectors to generate an aircraft fault prediction classifier.

Particular implementations are described with reference to the drawings. In the description, common features are designated by common reference numbers throughout the drawings. As used herein, various terminology is used for the purpose of describing particular implementations only and is not intended to be limiting. For example, the singular forms "a," "an," and "the" are intended to include the plural forms as well, unless the context clearly indicates otherwise. Further, the terms "comprise," "comprises," and "comprising" may be used interchangeably with "include," "includes," or "including." Additionally, it will be understood that the term "wherein" may be used interchangeably with "where." As used herein, "exemplary" may indicate an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

In the present disclosure, terms such as "determining", "calculating", "generating", "adjusting", "modifying", etc. may be used to describe how one or more operations are performed. It should be noted that such terms are not to be construed as limiting and other techniques may be utilized to perform similar operations. Additionally, as referred to herein, "generating", "calculating", "using", "selecting", "accessing", and "determining" may be used interchangeably. For example, "generating", "calculating", or "determining" a parameter (or a signal) may refer to actively generating, calculating, or determining the parameter (or the signal) or may refer to using, selecting, or accessing the parameter (or signal) that is already generated, such as by another component or device. Additionally, "adjusting" and "modifying" may be used interchangeably. For example, "adjusting" or "modifying" a parameter may refer to changing the parameter from a first value to a second value (a "modified value" or an "adjusted value"). As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive electrical signals (digital signals or analog signals) directly or indirectly, such as via one or more wires, buses, networks, etc. As used herein, "directly coupled" may include two devices that are coupled (e.g., communicatively coupled, electrically coupled, or physically coupled) without intervening components.

Implementations described herein describe model-free systems and methods for aircraft (or other vehicle) fault detection. The approach is generic for any type of time-series flight sensor data from any phase of flight. The techniques described herein use sequences of latent feature state values (e.g., temporal signatures) in a supervised learning algorithm to generate an aircraft fault prediction classifier.

The sequences of latent feature state values are determined based on parametric data from flight sensors (or other vehicle sensors) and are used as feature vectors in training the aircraft fault prediction classifier, as further described herein. In a particular example, a clustering operation is performed on the data from the sensors to generate latent feature state values, and sequences of the latent feature state values over sampling periods are determined to generate the feature vectors.

Once the feature vectors are generated, the feature vectors are labeled based on a temporal proximity of each feature vector (e.g., the sequence of latent feature state values) to occurrence of a fault. For example, feature vectors corresponding to time periods within a particular range of a fault (e.g., three minutes before a fault) are labeled with a first label value (e.g., a numerical value corresponding to "precursors"), and feature vectors associated with time periods that are not within the particular range of the fault are labeled with a second label value (e.g., a numerical value corresponding to "normal"). At this stage, feature vectors are identified as precursors to a fault state based solely on their temporal proximity to the occurrence of a fault. However, not every sequence of latent state feature values that precedes a fault is actually responsible for or correlated with the fault, and thus labeling each feature vector based on temporal proximity to the occurrence of a fault leads to false positive labels for some of the feature vectors.

To reduce the number of false positive identifications of precursors to a fault state, the probability that each feature vector of a subset of the feature vectors is correctly labeled is determined. In a particular implementation, the labeled feature vectors are provided as training data to a probability classifier, such as a random forest regression predictor, to determine the probabilities. The random forest regression predictor is trained to perform a regression analysis on the plurality of feature vectors and the labels to output a regression values, where the regression values indicate the probability that feature vectors of the subset of feature vectors are correctly labeled given the plurality of feature vectors. The subset of feature vectors includes feature vectors that are labeled with a first label value (e.g., feature vectors that are within the particular range of the fault and are labeled with a numerical value corresponding to "precursors"). Feature vectors of the subset of feature vectors that have a probability that fails to satisfy a probability threshold are relabeled with a second label value (e.g., a numerical value corresponding to "normal"). Feature vectors outside of the subset (e.g., feature vectors labeled with the numerical value corresponding to "normal") and feature vectors of the subset that have probabilities that do not satisfy the probability threshold are not relabeled. Thus, probabilities are used to reclassify some feature vectors labeled as precursors of a fault as fault as normal feature vectors (e.g., not fault precursors).

After reassigning the labels of one or more feature vectors, the labeled feature vectors are used as training data for an aircraft fault prediction classifier. The aircraft fault prediction classifier is trained to predict occurrences of faults (e.g., identify sequences of latent state feature values that are precursors to faults) based on input data. In a particular implementation, the aircraft fault prediction classifier includes a random forest classifier that is configured to output a label (e.g., the first label or the second label) based on an input feature vector. The aircraft fault prediction classifier can be executed on real-time (or near real-time) sensor data of an aircraft (after generation of a feature vector of latent feature state values) to predict a fault of the aircraft. In some implementations, the aircraft fault prediction classifier generates a prompt indicating the predicted occurrence and a particular repair or part associated with the prediction. Additionally, or alternatively, the aircraft fault prediction classifier can reorganize a repair schedule for the aircraft based on the prediction. Thus, the implementations described herein describe a data-driven approach that determines the sequence of latent feature state values before a fault for use in fault prediction and repair without extensive human labeling of time-series data and that reduces false positive identifications of faults (or precursors to faults).

FIG. 1 illustrates an example of a particular implementation of a system 100 that generates one or more aircraft fault prediction classifiers. The system 100 includes one or more sensors 102, a computing device 104, and a display device 106. In a particular implementation, the system 100 is integrated into a vehicle. For example, the system 100 may be integrated in an aircraft, an unmanned aerial vehicle (UAV) (e.g., a drone aircraft), an automobile, a train, a motorcycle, a bus, a ship or boat, a rocket, a spacecraft, an autonomous vehicle, or another vehicle, as illustrative, non-limiting examples. In other implementations, one or more components may be external to the vehicle, such as the sensors 102, the computing device 104, the display device 106, or a combination thereof.

The sensors 102 are configured to perform readings of one or more aspects or characteristics of the vehicle to generate the sensor data 150. In a particular implementation, the sensors 102 are coupled to one or more aircraft, and the sensors 102 are configured to generate the sensor data 150 before, during, and after a flight of the one or more aircraft. The sensors 102 may include multiple types of sensors. As illustrative examples, the sensors 102 can include a speed sensor, an altitude sensor, a pressure sensor, a control surface sensor (e.g., a flap position indicator), a landing gear position indicator, a fuel flow rate sensor, an engine sensor (e.g., an engine revolutions-per-minute (RPM) sensor), a vibration sensor, a temperature sensor, other sensors, or a combination thereof.

The sensor data 150 includes time-series data indicating values of one or more parameters (e.g., variables). To illustrate, the sensors 102 are configured to measure one or more characteristics, either continually or at discrete intervals. The measured values can be referred to as samples, and the measurement rate may be referred to as a sampling rate. As non-limiting examples, the sensor data 150 includes fan air modulating valve (FAMV) sensor values that measure temperatures, pressures, and positions of the FAMVs. As another non-limiting example, the sensor data 150 includes flow control valve (FCV) sensor values that measure altitude and positions of the FCVs. In other examples, the sensor data 150 includes other types of sensor values. In some implementations, the sensor data 150 is timestamped. In other implementations, the sensor data 150 includes a start time and a sampling rate, and the sensor data is timestamped or synchronized by the computing device 104 or by another component, such as another processor or a controller of the aircraft.

In some implementations, the computing device 104 is coupled to the sensors 102 and configured to obtain the sensor data 150 from the sensors 102. In a particular implementation, the computing device 104 is coupled to the sensors 102 via a network. The network can include a wired network or a wireless network. The network can be configured in accordance with one or more wireless communication protocols, such as an Institute of Electrical and Electronics Engineers (IEEE) protocol, a Wi-Fi Alliance protocol, a Bluetooth® protocol, a Zigbee® protocol, a near-field communication protocol, a cellular protocol, a Long Term Evolution (LTE) protocol, or a combination thereof. Bluetooth is a registered trademark of Bluetooth Special Interest Group (SIG), and Zigbee is a registered trademark of Zigbee Alliance. In another particular implementation, the computing device 104 is coupled to an interface (e.g., a bus) of a sensor system of the aircraft and configured to receive the sensor data 150 via the interface. In other implementations, the computing device 104 is external to the aircraft and configured to receive the sensor data 150 from one or more intermediary devices, such as a data storage device or other memory of the aircraft that stores the sensor data 150. In some implementations, the sensor data 150 is received from multiple aircraft via one or more intermediary devices, such as a server that stores the sensor data 150.

In some implementations, the sensor data 150 is from sensor readings before, during, and after flights of a particular aircraft. For example, the sensor data 150 can include sensor data from multiple legs of one flight or multiple legs of multiple different flights. Additionally, the sensor data 150 can include sensor readings from before, during, and after flights of other aircraft. For example, the sensor data 150 can include sensor data from a particular leg of flights of multiple different aircraft, different legs of different flights across multiple different aircraft, or any combination thereof.

The computing device 104 includes an input interface 110, a processor 112 coupled to the input interface 110, and a memory 114 coupled to the processor 112. In a particular implementation, the input interface 110, the processor 112, and the memory 114 are coupled together via a bus or other interface. The input interface 110 is configured to receive user input from a user input device, such as a keyboard, a mouse, a touchscreen, a camera (for gesture commands), a microphone (for voice commands), or a combination thereof, as non-limiting examples. The memory 114 includes a volatile memory, a non-volatile memory, or a combination thereof. The processor 112 is configured to execute instructions stored at the memory 114 to perform the operations described herein.

In the implementation illustrated in FIG. 1, the instructions include feature vector generation instructions 120, labelling instructions 122, probability determination instructions 124, label reassigning instructions 126, and classifier generation instructions 128. The feature vector generation instructions 120 are configured to generate feature vectors 130 based on the sensor data 150, as further described herein. The labelling instructions 122 are configured to label the feature vectors 130 with the first labels 136, as further described herein. The probability determination instructions 124 are configured to determine a probability that each of a subset of the first labels 136 is correct, as further described herein. The label reassigning instructions 126 are configured to reassign one or more of the first labels 136 based on the probabilities to generate the second labels 138, as further described herein. The classifier generation instructions 128 are configured to generate and train an aircraft fault prediction classifier 140, as further described herein.

The display device 106 is coupled to the computing device 104 and configured to display an output based on data from the computing device 104. For example, the display device 106 can include a screen, a touchscreen, a monitor, or another type of display device. Although illustrated as being external to the computing device 104, in other implementations, the display device 106 is integrated within the computing device 104.

During operation, the processor 112 receives the sensor data 150. The sensor data 150 includes time-series data of sensor readings and corresponding timing. The processor 112 also receives fault data 132, which can be stored at the memory 114. The fault data 132 indicates the timing that faults were detected at the one or more aircraft. For example, the fault data 132 indicates times that maintenance messages were generated by the one or more aircraft, the maintenance messages indicating occurrence of a fault.

The feature vector generation instructions 120 generate the feature vectors 130 based on the sensor data. The feature vectors 130 include sequences of latent feature state values over a plurality of sample time periods, where one latent feature state value corresponds to one sample time period. To determine the latent state values, the processor 112 performs a clustering operation on the sensor data 150 to group the sensor data 150 into the latent feature state values. The clustering operation can include any type of clustering operation, such as centroid clustering operations (e.g., k-Means, k-Medians, k-Medoids, etc.), distribution clustering operations, expectation maximization (EM) clustering operations, hierarchical clustering operations, density clustering operations (e.g., DBSCAN), other types of clustering operations, or any combination thereof. In a particular implementation, each latent feature state value corresponds to a cluster in a j-dimensional feature space, where j is the number of types of sensor variables in the sensor data 150. Additional details of generating the latent feature state values are further described with reference to FIG. 2. After the latent feature state values are determined, the feature vectors 130 are generated based on the latent feature state values. For example, a first feature vector includes a first sequence of latent feature state values (e.g., each element of the first feature vector indicates a latent feature state value), and a second feature vector indicates a second sequence of latent feature state values.

In a particular implementation, generating the sequences of latent feature state values may reduce the size of the sensor data 150. For example, generating the sequences of latent feature state values stored as the feature vectors 130 reduces the amount of information to be stored at the memory 114, as compared to storing an entirety of the sensor data 150. To further illustrate, instead of storing multiple measurements at each sample time, the sensor data 150 for the time period is represented as a single latent feature state value. Thus, storage space at the memory 114 may be reduced by converting the sensor data 150 to the feature vectors 130.

After generating the latent feature state values, the feature vector generation instructions 120 determine sequences of the latent feature state values, and these sequences of latent feature state values are the feature vectors 130. For example, a rolling window of n time-steps is used to identify a sequence of n latent feature state values as a feature vector. For example, each element of the feature vector indicates a latent feature state value in a sequence based on time steps associated with the latent feature state values.

After the feature vectors 130 are generated, each of the feature vectors 130 is labelled. For example, the labelling instructions 122 are configured to label each feature vector with a first label value or a second label value. The first label value corresponds to feature vectors that are identified as precursors to a fault, and the second label value corresponds to "normal" feature vectors (e.g., feature vectors that are not precursors to a fault). For example, each feature vector is labeled with a numerical value, such as a first numeric value (e.g., 1) that corresponds to a precursor or a second numerical value (e.g., 0) that corresponds to a "normal" feature vector. The labels for each of the feature vectors 130 are stored at the memory 114 as the first labels 136.

Each of the feature vectors 130 is labeled based on a temporal proximity of the feature vector 130 to occurrence of a fault. To illustrate, the labelling instructions 122 access the fault data 132 to determine times at which faults occurred (e.g., times at which maintenance messages were generated). Additionally, or alternatively, at least some of the sensor data 150 includes historical data including at least some data with corresponding fault indications (e.g., at least some of the sensor data 150 can be labeled when received by the computing device 104). Sequences of latent feature state values that occur within a threshold temporal proximity (e.g., m seconds) of the fault are labeled with the first label value (e.g., 1), and feature vectors that are not within the threshold temporal proximity to the occurrence of the fault are labeled with a second label value (e.g., 0). As a particular example, each feature vector that corresponds to a time period that is three minutes before occurrence of a fault is labeled with the first label value (e.g., 1, corresponding to "precursor"). In this example, feature vectors that correspond to time periods that are not three minutes before occurrence of a fault are labeled with the second label value (e.g., 0, corresponding to "normal"). In other examples, m is less than three minutes or greater than three minutes (e.g., one hundred eighty seconds).

The value of m is selected based on the competing concerns of correctly identifying the sequence of latent feature state values that led to the fault and reducing the number of false positive identifications. For example, increasing m increases the number of feature vectors (e.g., sequences of latent feature state values) that are initially labeled with the first label value, which increases the likelihood that the feature vector that caused the fault will be identified, but also increases the number of feature vectors that are false positives (e.g., labeled with the first label value but actually unrelated to the fault). Decreasing m decreases the number of feature vectors that are initially labeled with the first label value, which decreases the number of false positives but also decreases the likelihood that the correct feature vector has been identified.

After generating the first labels 136, probabilities that a subset of the first labels 136 are correct are determined. For example, the probability determination instructions 124 are configured to determine, for each feature vector of a subset of the feature vectors 130, a probability that the label associated with the feature vector is correct. The probabilities are used in relabeling one or more of the feature vectors 130, as further described herein. The subset includes feature vectors having labels that indicate the first label value (e.g., 1, corresponding to "precursors"). For example, the probability determination instructions 124 are configured to determine the probability that the feature vectors labeled with the first label value have been correctly labeled.

In a particular implementation, the probability determination instructions 124 are configured to generate and train a probability predictor 134. The probability predictor 134 is configured to determine the probability that each feature vector is correctly labeled. In a particular implementation, the probability predictor 134 includes a random forest regression predictor. For example, the random forest regression predictor includes multiple regression decision trees that are trained using a supervised learning process that uses the feature vectors 130 and the first labels 136 as input. Each decision tree is configured to output a numerical value based on a random sampling of the features of the feature vectors 130, and outputs of the multiple regression decision trees are averaged together to generate the output of the random forest regression predictor. Because outputs of multiple regression decision trees are averaged together, the random forest regression predictor reduces a likelihood of overfitting to the training data while maintaining an acceptable level of complexity and prediction speed.

The regression random forest predictor returns a regression value for each of the training and test feature vectors that are provided to the regression random forest predictor. The regression values are interpreted as a data-driven confidence score for how well each feature vector is associated with its class (e.g., precursor or normal). This is possible because the initial labels of the feature vectors 130 are numerical (e.g., 1, corresponding to precursors, and 0, corresponding to normal). Thus, after training the random forest regression predictor, the subset of the feature vectors 130 are provided to the random forest regression predictor and outputs (e.g., the regression values) of the random forest regression predictor are used to determine the probability that each feature vector of the subset of the feature vectors 130 is correctly labeled.

In other implementations, the probability predictor 134 includes a different type of predictor, such as a neural network predictor, a support vector machine predictor, a Bayesian predictor, a perceptron predictor, or another type of predictor. Use of the probability predictor 134 enables efficient determinations of the probabilities using machine learning techniques.

After determining the probabilities associated with the subset (e.g., with the feature vectors that are labeled with the first label value), one or more of the first labels 136 are reassigned to generate the second labels 138. For example, the label reassigning instructions 126 are configured to reassign labels of one or more of feature vectors of the subset of the feature vectors 130. The one or more feature vectors (e.g., the feature vectors having labels that are reassigned) have a label prior to reassigning that indicates the first label value (e.g., 1, corresponding to "precursor") and have a probability that fails to satisfy a probability threshold. For example, one or more feature vectors that are labeled with the first label value (e.g., corresponding to "precursors") and that have a probability (e.g., based on the output of the probability predictor 134) that fails to satisfy a probability threshold are relabeled with the second label value (e.g., 0, corresponding to "normal" feature vectors) in the second labels 138. Although referred to as being relabeled with numerical label values (e.g., 0 or 1), in other implementations, all of the labels can be labeled using categorical label values (e.g., "precursor" or "normal"). Thus, one or more feature vectors that are within the threshold temporal proximity of occurrence of a fault (one or more feature vectors in the subset that are initially labeled as with the first label value) are relabeled based on the probability with the second label value. Relabeling the one or more feature vectors reduces false positive identifications of feature vectors as "precursors," because based on the corresponding probability, the one or more features have a low likelihood of being the cause of a fault. Additionally, some of the first labels 136 are not relabeled. For example, the label reassigning instructions 126 are configured to refrain from relabeling feature vectors that have labels indicating the second label value (e.g., feature vectors that are labeled "normal"). As another example, the label reassigning instructions 126 are configured to refrain from labeling feature vectors of the subset (e.g., feature vectors that are labeled "precursors") having probabilities that satisfy the probability threshold. Thus, feature vectors that are likely to be related to a fault remain labeled with the first label value (e.g., as "precursors").

After reassigning the labels (e.g., generating the second labels 138), the aircraft fault prediction classifier 140 is trained. For example, the classifier generation instructions 128 are configured to generate and train the aircraft fault prediction classifier 140. The aircraft fault prediction classifier 140 is trained using training data that includes the feature vectors 130 and the second labels 138. For example, each feature vector is labeled as a "precursor" or as "normal" (either using numeric label values or categorical label values), and the labeled feature vectors are used in a supervised learning process to train the aircraft fault prediction classifier 140 to predict occurrence of a fault of an aircraft based on input sensor data. The training data preferably includes multiple feature vectors that are labeled with the first label value (e.g., "precursor") and multiple feature vectors that are labeled with the second label value (e.g., "normal").

In a particular implementation, the aircraft fault prediction classifier 140 includes a random forest classifier. The random forest classifier includes multiple decision tree classifiers that are trained using a supervised learning process, based on the feature vectors 130 and the second labels 138, to determine whether an input feature vector is associated with a first label value (e.g., 1, or "precursor") or a second label value (e.g., 0, or "normal"). Each decision tree classifier is trained using a random (or pseudorandom) selection of features from the feature vectors 130 to output a classification (e.g., to label an input feature vector as a "precursor" or as "normal"). The outputs of the multiple decision tree classifiers are aggregated using a majority voting process. For example, if more decision tree classifiers output "precursor" for a given input feature vector than output "normal", the output of the random forest classifier is "precursor." Because the output of the random forest classifier is an aggregation of outputs of multiple decision tree classifiers, the random forest classifier reduces a likelihood of overfitting to the training data while maintaining an acceptable level of complexity and classification speed. Thus, the output of the random forest classifier is a label value associated with an input feature vector. Although described as a random forest classifier, in other implementations, the aircraft fault prediction classifier 140 includes a different type of classifier, such as a neural network classifier, a support vector machine classifier, a Bayesian classifier, a perceptron classifier, or another type of classifier.

In a particular implementation, during operation of an aircraft, the computing device 104 receives real-time sensor data 152 (or near real-time sensor data) from the sensors 102. As used herein, sensor data received in real-time or near real-time refers to sensor data that is generated during the operation of the aircraft (or other vehicle) and received from the sensors 102 after any processing is performed. For example, the sensors 102 are configured to monitor the aircraft to generate the real-time sensor data 152 and pass (or process and pass) the real-time sensor data 152 to the computing device 104. Unlike the sensor data 150, which can include historical sensor data from multiple aircraft (e.g., multiple aircraft having a same type, multiple different types of aircraft, or a combination thereof), the real-time sensor data 152 is received from a particular aircraft while the particular aircraft is in flight (or otherwise in operation). The processor 112 executes the feature vector generation instructions 120 to generate additional feature vectors based on the real-time sensor data 152. The additional feature vectors are generated according to the process for generating the feature vectors 130. After the additional feature vectors are generated, the additional feature vectors are provided to the aircraft fault prediction classifier 140, which outputs an indication of whether or not a fault is predicted based on the real-time sensor data 152 (e.g., based on the additional feature vectors). Thus, the aircraft fault prediction classifier 140 can be used to predict whether a fault will occur during operation of an aircraft (or other vehicle) based on real-time sensor data from the aircraft (or other vehicle).

In a particular implementation, the processor 112 is configured to execute the aircraft fault prediction classifier 140. For example, the computing device 104 can be implemented in an aircraft, and the processor 112 is configured to execute the aircraft fault prediction classifier 140 during flight of the aircraft to predict occurrence of a fault. Alternatively, the aircraft fault prediction classifier 140 can be generated by the computing device 104 and provided to another device for execution. For example, the computing device 104 can be implemented in a ground station, and the aircraft fault prediction classifier 140 can be generated at the ground station and then provided to an aircraft for execution during operation of the aircraft. The aircraft executes feature generation instructions to generate feature vectors based on real-time sensor data, and the feature vectors are provided to the aircraft fault prediction classifier 140 for use in predicting a fault state of the aircraft.

In a particular implementation, the processor 112 is configured to generate a graphical user interface (GUI) 160 for display at the display device 106. For example, the memory 114 stores GUI generation instructions that are executable by the processor 112. The GUI 160 indicates the results of execution of the aircraft fault prediction classifier 140 on the real-time sensor data 152. As a particular example, the GUI 160 can include a prompt 162 indicating a predicted occurrence of a fault and a particular repair associated with the predicted occurrence of the fault. To illustrate, data stored at the memory 114 can correlate one or more sequences of latent feature state values (e.g., feature vectors) with particular types of faults, and the particular types of faults can be associated with different repairs to be performed on the aircraft. The processor 112 issues the prompt 162 after matching a particular feature vector to a corresponding repair. As another particular example, the GUI 160 can include an indication of a repair schedule 164, and the repair schedule can be re-organized based on the prediction of the occurrence of the fault. For example, a scheduled repair or downtime for the aircraft can be accelerated due to prediction of a fault by the aircraft fault prediction classifier 140.

The system 100 enables generation of the aircraft fault prediction classifier 140 in a fast and efficient manner. Because the aircraft fault prediction classifier 140 is trained based on the feature vectors 130 (e.g., based on the sensor data 150), the techniques described herein are data driven, as compared to physics-based models that are generated to model operating states of an aircraft. These physics-based models can take long to develop and can use significant processing and storage resources. As another benefit, the training data used to train the aircraft fault prediction classifier 140 is labeled by the system 100, thereby reducing (or eliminating) labeling of time-series data performed by a user. Additionally, because the feature vectors 130 are relabeled prior to being used as the training data, false positive identifications of faults by the aircraft fault prediction classifier 140 are reduced. Thus, the system 100 enables generation of the aircraft fault prediction classifier 140 that reduces repair time or downtime of an aircraft and has fewer false positive identifications of faults, which improves the utility of the aircraft fault prediction classifier 140.

Figure 2:
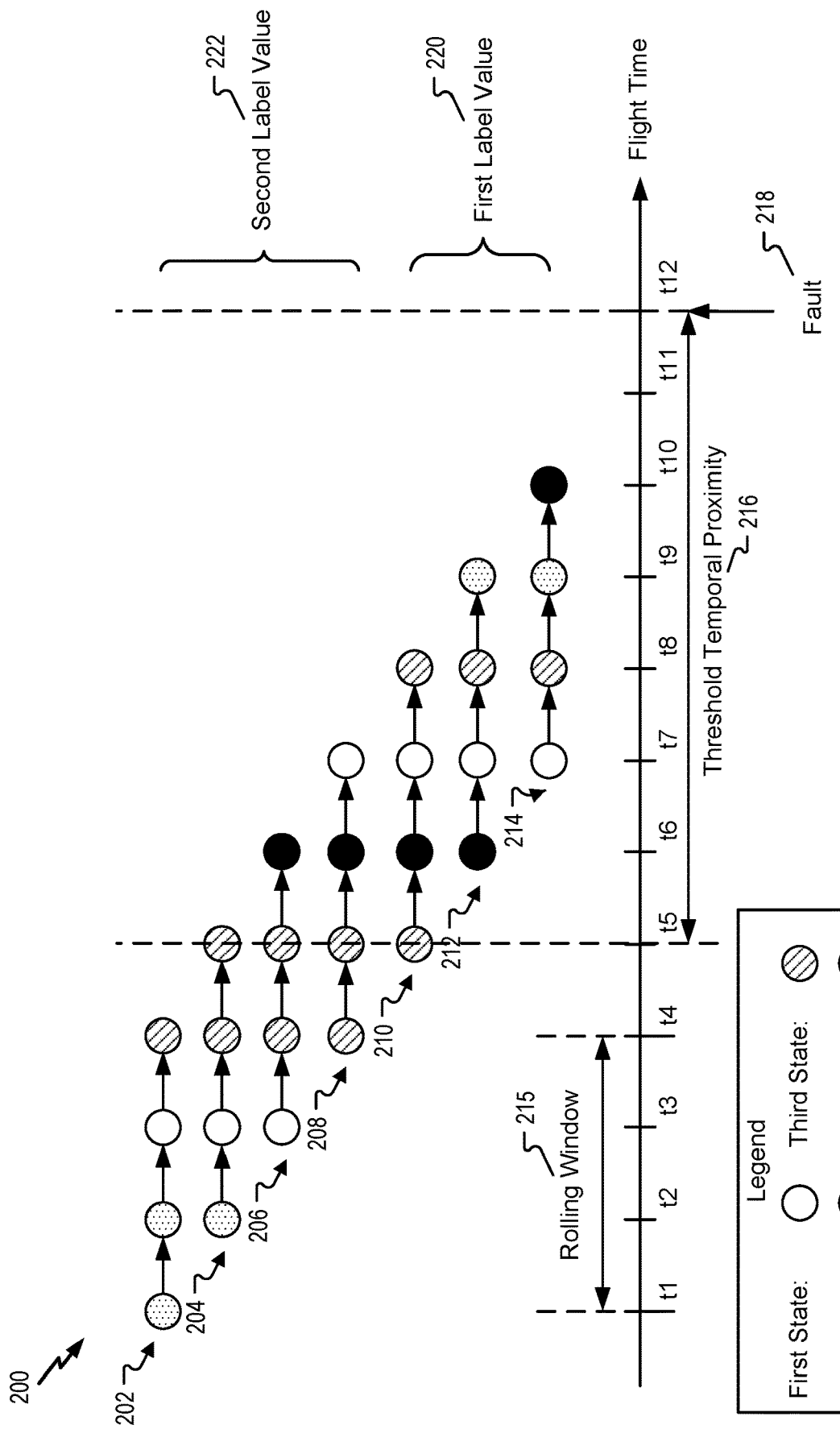
FIG. 2 illustrates an example of determining sequences of latent feature state values.

Referring to FIG. 2, an example of determining sequences of latent feature state values is shown and generally designated 200. The sequences of latent feature state values are determined based on the sensor data 150 of FIG. 1. Once the sequences of latent feature state values are determined, the values of the sequences are stored as the feature vectors 130.

To determine the sequences of latent feature values, the sensor data 150 is first converted into latent feature state values. To convert the sensor data 150 into latent feature state values, a clustering operation is performed on the sensor data 150. The clustering operation groups members (e.g., data points) of the sensor data 150 into clusters in a j-dimensional feature space, where j is the number of types of sensor variables (e.g., parameters) in the sensor data 150, based on characteristics and relationships of the data points. Clustering is performed using an unsupervised learning process because the sensor data 150 is not labeled prior to clustering.

In a particular implementation, k-Means clustering is performed on the sensor data 150 to cluster the sensor data 150 in a feature space. To illustrate, a number of clusters is determined, and cluster centers for each of the clusters are initially set in the feature space. In a particular implementation, the number of clusters is determined based on a user input, based on an additional analysis of the data, or in some other way. After initializing each of the cluster centers in the feature space, data points are added to the various clusters and locations of the cluster centers are modified. For example, in response to determining that a first data point is closer to a first cluster than to any other of the clusters, the first data point is added to the first cluster, and the location of the center of the first cluster is modified (e.g., updated) to be between the location of the initial cluster center and the location of the first data point. In a particular implementation, the cluster center is updated such that the square of the Euclidean distance between the cluster center and each data point in the first cluster is minimized. Additional points may be added to the clusters in a similar manner. For example, a second data point can be added to a second cluster based on the second data point being closer to the cluster center of the second cluster than to the center of any other cluster, and the location of the cluster center of the second cluster is updated based on the location of the second data point. The first clustering operation continues until all data points (e.g., of the sensor data 150) are assigned to a corresponding cluster, and each of the locations of the cluster centers are updated based on the assignments.

In another implementation, a k-Medoids clustering operation is performed on the sensor data 150 to determine the latent feature state values. The k-Medoids clustering operation is similar to the k-Means clustering operation, except that a cluster center is updated to a location of a data point in the cluster that minimizes the difference between the location of the cluster center and the location of each data point in the cluster. The k-Medoids clustering operation can be more robust to noise and outliers than the k-Means clustering operation.

In another particular implementation, a Gaussian Mixture Model (GMM) clustering operation, such as a Dirichlet Process GMM (DPGMM) clustering operation, is performed on the sensor data 150 to determine the latent feature state values. To illustrate, cluster centers are determined based on the assumption that the data points around each cluster center are normally distributed. Specifically, DPGMM assumes an infinite mixture model with the Dirichlet Process as a prior distribution on the number of mixture models in a GMM, where "mixtures" correspond to the states or clusters. In a DPGMM, the number of clusters most appropriate for the data is computed according to a distribution, $G(\mu)$, which can be defined by Equation 1.

$$G(\tilde{\mu}_i) = \sum_{k=1}^{\infty} \pi_k \delta_{\mu_k}(\tilde{\mu}) \qquad \text{(Equation 1)}$$

The values of the cluster means $\tilde{\mu}_i$ are distributed according to the distribution $H(\lambda)$ (where $H(\lambda)$ represents the user's prior beliefs on the distribution of the clusters and can be assigned to be any parametric distribution with parameter $\lambda$ of the user's choice). $\delta_{\mu_k}$ is an indicator function. The distribution over $\pi_k$ is symmetric over the infinite set of clusters, where $\pi_k$ is the prior probability of a data point belonging to the kth cluster. Finding the optimal number of clusters (which translate to the number of latent feature states) that will describe the data based on the assumptions of Dirichlet Process distribution with parameter), over the number of clusters and a Gaussian model for the distribution within points in a cluster means finding a posterior distribution over cluster probabilities and their associated means. In a particular implementation, determining the number of clusters is performed through Markov Chain Monte Carlo (MCMC) sampling over the posterior probability of the number of clusters.

In other implementations, other types of clustering operations are performed, such as hierarchical clustering, mean-shift clustering operations, connectivity clustering operations, density clustering operations (such as DB SCAN), distribution clustering operations, EM clustering operations, or other types of clustering operations or algorithms.

Each cluster represents a latent feature state value in the feature space. After clustering the sensor data 150 into the latent feature state values, sequences of latent feature state values are determined. In the example illustrated in FIG. 2, the sensor data 150 is clustered into one of four clusters, and each cluster represents one of four states: a first state, a second state, a third state, and a fourth state. At each time t, a latent feature state value may be determined based which cluster the data point corresponding to the time t is placed into by the clustering operation. In the example illustrated in FIG. 2, as a result of the clustering operation, time t1 is associated with the second state, time t2 is associated with the second state, time t3 is associated with the first state, time t4 is associated with the third state, time t5 is associated with the third state, time t6 is associated with the fourth state, time t7 is associated with the first state, time t8 is associated with the third state, time t9 is associated with the second state, and time t10 is associated with the fourth state. In other examples, the sensor data 150 is clustered into fewer than four or more than four clusters.

After determining the latent state feature values based on the sensor data 150, sequences of latent state feature values are determined. In a particular implementation, the sequences are determined by applying a rolling window 215 to the latent feature state values. For example, a rolling window having n samples may be applied to the latent feature state values to determine sequences of latent feature state values having length n. In the example illustrated in FIG. 2, n is four time steps. The time steps can correspond to any increment of time, and in other implementations, n is less than four or more than four time steps. Selecting sequences of latent feature state values (also referred to as temporal sequences of latent features (TSLFs)) having n length in the example of FIG. 2 generates a first sequence of latent feature state values 202, a second sequence of latent feature state values 204, a third sequence of latent feature state values 206, a fourth sequence of latent feature state values 208, a fifth sequence of latent feature state values 210, a sixth sequence of latent feature state values 212, and a seventh sequence of latent feature state values 214. The first sequence of latent feature state values 202 corresponds to times t1-t4, the second sequence of latent feature state values 204 corresponds to times t2-t5, the third sequence of latent feature state values 206 corresponds to times t3-t6, the fourth sequence of latent feature state values 208 corresponds to times t4-t7, the fifth sequence of latent feature state values 210 corresponds to times t5-t8, the sixth sequence of latent feature state values 212 corresponds to times t6-t9, and the seventh sequence of latent feature state values 214 corresponds to times t7-t10. Additional sequences of latent feature state values can be determined beginning at times t8, t9, t10, t11, etc.

The sequences of latent feature state values 202-214 include sequences of n feature values that are associated with sequential time steps. In the example illustrated in FIG. 2, the first sequence of latent feature state values 202 includes the second state, followed by the second state, followed by the first state, followed by the third state. The second sequence of latent feature state values 204 includes the second state, followed by the first state, followed by the third state, followed by the third state. The third sequence of latent feature state values 206 includes the first state, followed by the third state, followed by the third state, followed by the fourth state. The fourth sequence of latent feature state values 208 includes the third state, followed by the third state, followed by the fourth state, followed by the first state. The fifth sequence of latent feature state values 210 includes the third state, followed by the fourth state, followed by the first state, followed by the third state. The sixth sequence of latent feature state values 212 includes the fourth state, followed by the first state, followed by the third state, followed by the second state. The seventh sequence of latent feature state values 214 includes the first state, followed by the third state, followed by the second state, followed by the fourth state.

The sequences of latent feature state values 202-214 can be stored as the feature vectors 130. To illustrate, determining a first feature vector of the feature vectors 130 includes determining the first sequence of latent feature state values 202 within a first set of sample time periods of a first time period (e.g., t1-t4). Each element of the first feature vector includes a corresponding latent feature state value of the first sequence of latent feature state values 202. In the example of FIG. 2, the first feature vector includes [2, 2, 1, 3] based on the latent feature state values of the first sequence of latent feature state values 202. To further illustrate, determining a second feature vector of the feature vectors 130 includes determining the second sequence of latent feature state values 204 within a second set of sample time periods of a second time period (e.g., t2-t5). Each element of the second feature vector includes a corresponding latent feature state value of the second sequence of latent feature state values 204. In the example of FIG. 2, the second feature vector includes [2, 1, 3, 3]. Further, as illustrated in FIG. 2, the time period associated with one feature vector can over lap with the time period associated with another feature vector. For example, the first feature vector and the second feature vector are associated with the overlapping time period of t2-t4 (e.g., due to the rolling window 215 being applied at each successive time step). Similarly, a third feature vector includes [1, 3, 3, 4], a fourth feature vector includes [3, 3, 4, 1], a fifth feature vector includes [3, 4, 1, 3], a sixth feature vector includes [4, 1, 3, 2], and a seventh feature vector includes [1, 3, 2, 4].

After determining the feature vectors corresponding to the sequences of latent feature state values 202-214, the feature vectors are labeled. The labeling is based on a temporal proximity of the feature vector to a fault. To illustrate, the sensor data 150 includes historical sensor data that is correlated to various times, and the fault data 132 indicates occurrences of faults at various times. In a particular implementation, the fault is indicated by generation of a maintenance message by the aircraft. For labeling purposes, the rolling window 215 of size n is used to determine the sequences of latent feature state values (and the corresponding feature vectors), and feature vectors associated with times that are within an amount of time m (e.g., a threshold temporal proximity) before the occurrence of the fault are labeled as "precursors" and other feature vectors are labeled as "normal." In a particular implementation, n is fifteen seconds and m is three minutes. In other implementations, n and m have other values.

To illustrate, in the example of FIG. 2, a fault 218 occurs at time t12. The feature vectors that are within a threshold temporal proximity 216 to the occurrence of the fault 218 are labeled with a first label value 220, and the feature vectors that are not within the threshold temporal proximity 216 to the occurrence of the fault 218 are labeled with a second label value 222. For example, the feature vectors corresponding to the fifth sequence of latent feature state values 210, the sixth sequence of latent feature state values 212, and the seventh sequence of latent feature state values 214 are assigned the first label value 220 (e.g., 1, corresponding to "precursors"), because these temporal sequences of latent feature state values occur entirely within the threshold temporal proximity 216. As another example, the feature vectors corresponding to the first sequence of latent feature state values 202, the second sequence of latent feature state values 204, the third sequence of latent feature state values 206, and the fourth sequence of latent feature state values 208 are assigned the second label value 222 (e.g., 0, corresponding to "normal") because at least a portion of the temporal sequences of latent feature state values occur outside of the threshold temporal proximity 216. Thus, feature vectors associated with times that are within the threshold temporal proximity 216 to occurrence of the fault 218 are initially labeled as "precursors," and feature vectors associated with times that are not within the threshold temporal proximity 216 to occurrence of the fault 218 are initially labels as "normal." As further described with reference to FIG. 1, one or more of these feature vectors are relabeled based on probabilities associated with the feature vectors, thereby reducing the false positive rates (e.g., rates of identifying sequences of latent feature state values as precursors even though the sequences of latent feature state values are not the proximate cause of a fault).

Thus, FIG. 2 illustrates converting sensor data (e.g., the sensor data 150 of FIG. 1) to sequences of latent feature state values. Storing feature vectors based on the sequences of latent feature state values, instead of storing an entirety of the sensor data, reduces use of storage space at the memory 114. Additionally, the feature vectors can be initially labeled based on temporal proximity to occurrence of a fault. This technique of initially labeling the feature vectors provides a "course" labeling, which can be "fine-tuned" by reassigning one or more labels based on probability values associated with the feature vectors, as further described with reference to FIG. 1.

Figure 3:
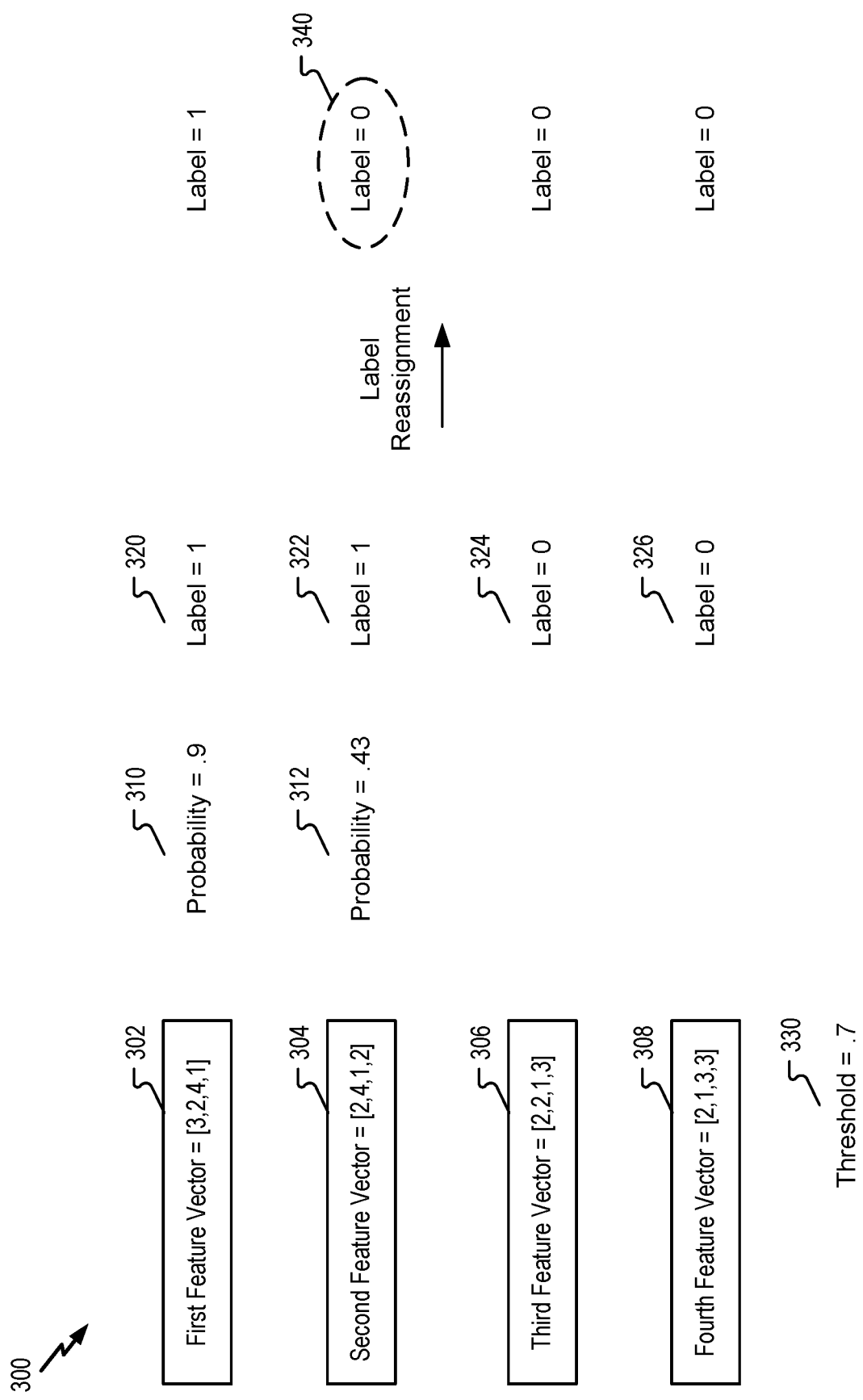
FIG. 3 illustrates an example of reassigning labels based on probabilities.

Referring to FIG. 3, an example of reassigning labels based on probabilities is shown and generally designated 300. Multiple feature vectors 302-308 are generated. For example, the feature vectors 302-308 include or correspond to the feature vectors 130 of FIG. 1. The feature vectors indicate sequences of latent feature state values, as described with reference to FIG. 2. In the example of FIG. 3, a first feature vector 302 includes [3, 2, 4, 1], a second feature vector 304 includes [2, 4, 1, 2], a third feature vector 306 includes [2, 2, 1, 3], and a fourth feature vector 308 includes [2, 1, 3, 3]. In other examples, the feature vectors have other values, and fewer than four or more than four feature vectors can be generated.

After the feature vectors 302-308 are determined, the feature vectors 302-308 are assigned labels based on whether the feature vectors are within a threshold temporal proximity to occurrence of a fault, as described with reference to FIG. 2. During this initial labeling process, it is determined that the first feature vector 302 and the second feature vector 304 are within a threshold temporal proximity to occurrence of a fault, and that the third feature vector 306 and the fourth feature vector 308 are not within a threshold temporal proximity of a fault. Accordingly, a label 320 of the first feature vector 302 and a label 322 of the second feature vector 304 are assigned with a first label value (e.g., 1, corresponding to "precursor"), and a label 324 of the third feature vector 306 and a label 326 of the fourth feature vector 308 are assigned a second label value (e.g., 0, corresponding to "normal").

After the initial label assignment, probabilities that the initial label assignments are correct for the feature vectors 302-304 are determined. As explained with reference to FIG. 1, the feature vectors 302-308 and the corresponding labels 320-326 are used as training data to train a probability classifier, such as a random forest regression classifier. Using the probability classifier, probability values that the corresponding feature vectors are correct are determined. In the example of FIG. 3, the first feature vector 302 is assigned a probability 310 of 0.9 and the second feature vector 304 is assigned a probability 312 of 0.43. Probabilities for the third feature vector 306 and the fourth feature vector 308 are not relevant because the labels of the third feature vector 306 and the fourth feature vector 308 have the second label value (e.g., 0, corresponding to "normal").

The probabilities 310-312 are compared to a probability threshold 330 to determine whether any of the probabilities 310-312 fail to satisfy (e.g., are less than) the probability threshold 330. In the example of FIG. 3, the probability threshold 330 is 0.7, thus, the probability 312 of the second feature vector 304 fails to satisfy the probability threshold 330.

To reduce the number of false positive identifications of precursors to fault states, one or more labels of the labels 320-322 are reassigned based on the probabilities 310-312. To illustrate, if a label has the first label value (e.g., 1, corresponding to "precursor") and the corresponding probability fails to satisfy the probability threshold 330, the label is reassigned to the second label value (e.g., 0, corresponding to "normal"). For example, because the second feature vector 304 is initially assigned the first label value and because the probability 312 fails to satisfy the probability threshold 330, the label 322 is reassigned to a reassigned label 340 having the second label value (e.g., 0, corresponding to "normal"). In FIG. 3, the labels 320 is not reassigned because the probability 310 satisfies the probability threshold 330. Additional, and the labels 324 and 326 are not reassigned because the initial label value is the second label value (e.g., 0, corresponding to "normal").

By reassigning labels based on probabilities, one or more false positive identifications of precursors to a fault are reduced. After the one or more labels are reassigned, the labeled feature vectors are used as training data to train the aircraft fault prediction classifier 140, as described with reference to FIG. 1. Training the aircraft fault prediction classifier 140 to output fewer false positive identifications of fault states improves the utility of the aircraft fault prediction classifier 140.

Figure 4:
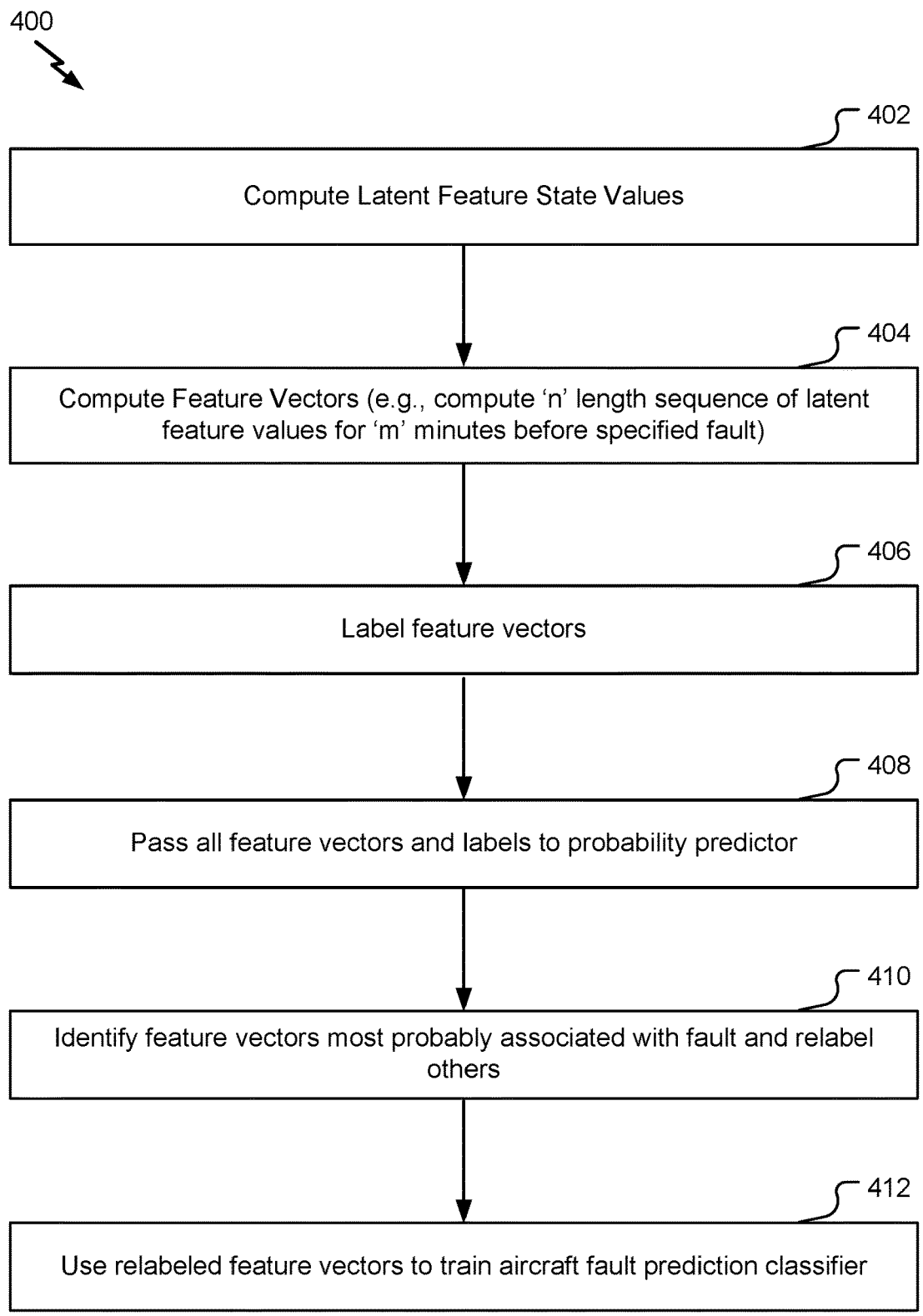
FIG. 4 is a flow chart of an example of a method of generating an aircraft fault prediction classifier.

FIG. 4 illustrates a method 400 of generating an aircraft fault prediction classifier. In a particular implementation, the method 400 is performed by the computing device 104 (e.g., by the processor 112).

The method 400 includes computing latent feature state values, at 402. For example, as described with reference to FIG. 2, latent feature state values are determined based on the sensor data 150. In a particular implementation, the latent feature state values are determined by performing a clustering operation on the sensor data 150 to group the sensor data 150 into clusters corresponding to latent feature state values. The clustering operation can be a k-Means clustering operation, a k-Medoids clustering operation, a DPGMM clustering operation, or another type of clustering operation.

The method 400 includes computing feature vectors, at 404. In a particular implementation, computing the feature vectors 130 includes computing n length sequences of latent feature state values. Feature vectors that are within a time period m prior to occurrence of a fault identified for labeling purposes.

The method 400 includes labeling feature vectors, at 406. For example, feature vectors that are within a threshold temporal proximity (e.g., the time period m) of occurrence of a fault are labeled with a first label value (e.g., a numerical value corresponding to "precursors"), and feature vectors that are not within the threshold temporal proximity to occurrence of the fault are labeled with a second label value (e.g., a numerical value corresponding to "normal"). This initial labeling process generates the first labels 136.

The method 400 includes passing the feature vectors and the labels to a probability predictor, at 408. For example, the feature vectors 130 and the first labels 136 are passed as supervised training data to the probability predictor 134. In a particular implementation, the probability predictor 134 includes a random forest regression classifier. In other implementations, the probability predictor 134 includes a neural network predictor, a support vector machine predictor, a Bayesian predictor, a perceptron predictor, or another type of predictor In addition to being trained to output a numerical value indicating a probability that an input feature vector belongs to a particular class (e.g., "precursor" or "normal"), the probability predictor 134 is used to determine probabilities that the feature vectors 130 are correctly labeled.

The method 400 includes identifying feature vectors that are most probably associated with a fault and relabeling other feature vectors, at 410. For example, feature vectors that are initially labeled with the first label value (e.g., "precursors") and that have a probability that satisfies a threshold (e.g., is greater than or equal to the threshold) are considered to be most probably associated with a fault, and therefore the labels of these feature vectors are maintained. Feature vectors that are initially labeled with the first label value (e.g., "precursors") and that have a probability that fails to satisfy the threshold (e.g., is less than the threshold) are relabeled with the second value (e.g., "normal"). The method 400 refrains from relabeling feature vectors that are initially labeled with the second label value (e.g., "normal"). Relabeling of one or more labels generates the second labels 138.

The method 400 further includes using the relabeled feature vectors to train an aircraft fault prediction classifier, at 412. For example, the feature vectors 130 and the second labels 138 are provided as supervised training data to the aircraft fault prediction classifier 140 to train the aircraft fault prediction classifier to predict faults based on input feature vectors. In a particular implementation, the aircraft fault prediction classifier 140 includes a random forest classifier. In other implementations, the aircraft fault prediction classifier includes other types of classifiers, such as a neural network classifier, a support vector machine classifier, a Bayesian classifier, a perceptron classifier, or another type of classifier.

The method 400 enables generating and training of the aircraft fault prediction classifier 140. Because the aircraft fault prediction classifier 140 is trained based on relabeled training data (e.g., the feature vectors 130 and the second labels 138, instead of the first labels 136), the aircraft fault prediction classifier 140 generates fewer false positive identifications of faults. Thus, the method 400 improves utility of the aircraft fault prediction classifier 140.

Figure 5:
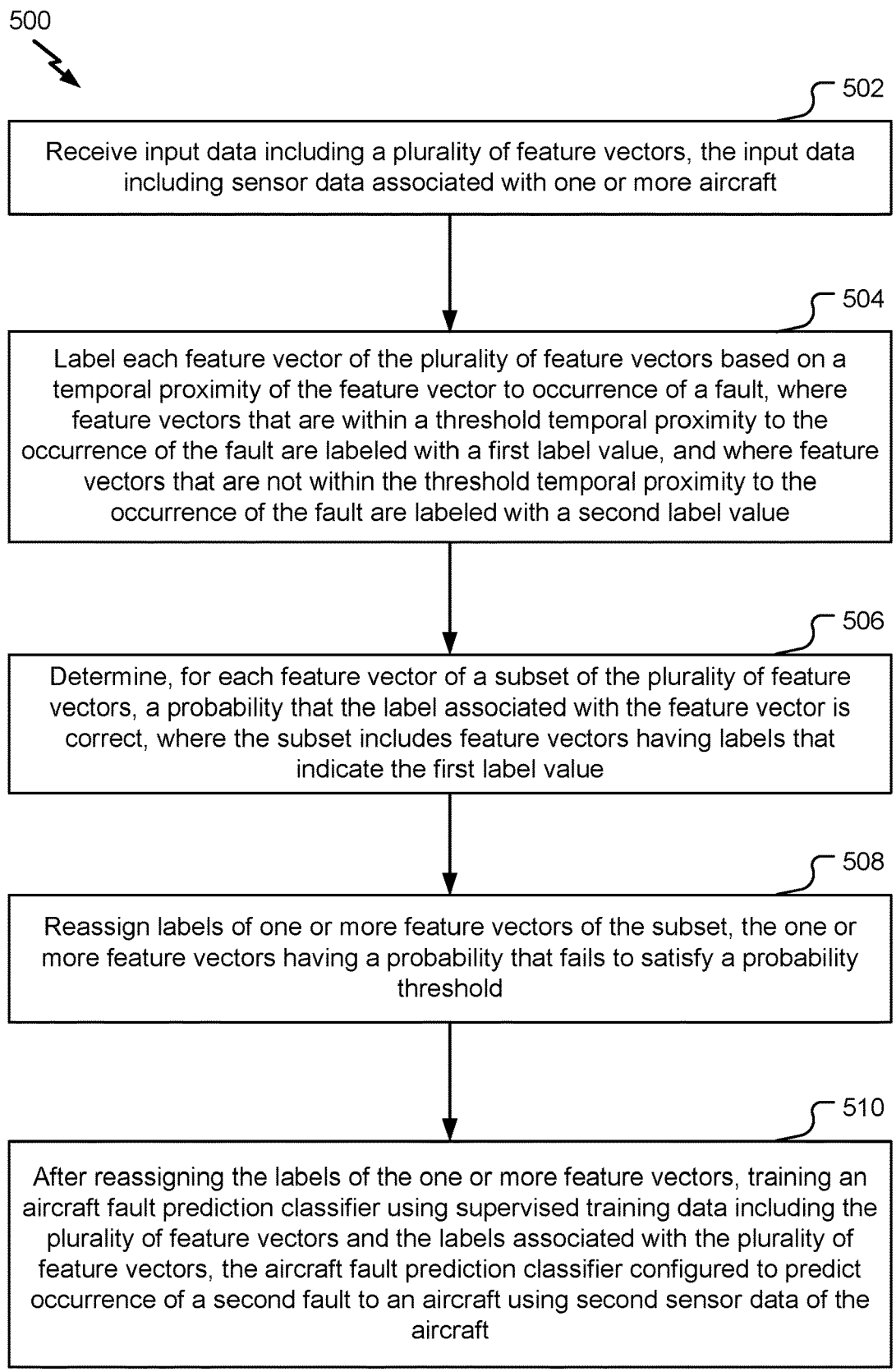
FIG. 5 is a flow chart of an example of a method of generating an aircraft fault prediction classifier.

FIG. 5 illustrate a method 500 of generating an aircraft fault prediction classifier. In a particular implementation, the method 500 is performed by the computing device 104 (e.g., by the processor 112).

The method 500 includes receiving input data including a plurality of feature vectors, at 502. The input data includes sensor data associated with one or more aircraft. For example, the processor 112 receives the sensor data 150 from the sensors 102 (or from one or more other devices, such as a data storage device, or stored at the memory 114).

The method 500 includes labeling each feature vector of the plurality of feature vectors based on a temporal proximity of the feature vector to occurrence of a fault, at 504. Feature vectors that are within a threshold temporal proximity to the occurrence of the fault are labeled with a first label value, and feature vectors that are not within the threshold temporal proximity to the occurrence of the fault are labeled with a second label value. For example, the feature vectors 130 are labeled based on the fault data 132 to generate the first labels 136. Each of the first labels 136 includes a first label value (e.g., a numerical value corresponding to "precursor") or a second label value (e.g., a numerical value corresponding to "normal") based on whether the corresponding feature vector is within the threshold temporal proximity of the fault.

The method 500 includes determining, for each feature vector of a subset of the plurality of feature vectors, a probability that the label associated with the feature vector is correct, at 506. The subset includes feature vectors having labels that indicate the first label value. For example, the first feature vectors 130 and the first labels 136 are provided to the probability predictor 134 to determine the probability that a subset of the feature vectors 130 are correctly labeled. The subset of the feature vectors 130 includes feature vectors that are labeled with the first label value (e.g., "precursors") during the initial labeling step.

The method 500 includes reassigning labels of one or more feature vectors of the subset, at 508. The one or more feature vectors have a probability that fails to satisfy a probability threshold. For example, a first feature vector is labeled with the first label value (e.g., "precursor") and has a probability that fails to satisfy the probability threshold. Accordingly, the label of the first feature vector is reassigned to the second label value (e.g., "normal"). Reassigning one or more of the first labels 136 generates the second labels 138.

The method 500 further includes, after reassigning the labels of the one or more feature vectors, training an aircraft fault prediction classifier using supervised training data including the plurality of feature vectors and the labels associated with the plurality of feature vectors, at 510. The aircraft fault prediction classifier is configured to predict occurrence of a second fault to an aircraft using second sensor data of the aircraft. For example, the feature vectors 130 and the second labels 138 are used as supervised training data to train the aircraft fault prediction classifier 140. The aircraft fault prediction classifier 140 is configured to predict a fault of an aircraft based on the real-time sensor data 152 from the sensor 102.

In a particular implementation, the one or more feature vectors are within the threshold temporal proximity to the occurrence. For example, the feature vectors that have labels that are reassigned are within the threshold temporal proximity to the occurrence of a fault (e.g., the feature vectors are initially assigned the "precursor" label). Reassigning one or more feature vectors that are within the threshold temporal proximity to a fault, and thus are labeled with the first value (e.g., "precursors"), reduces false-positive identifications of fault states by the aircraft fault prediction classifier 140, which improves utility of the aircraft fault prediction classifier 140.

In a particular implementation, the aircraft fault prediction classifier includes a random forest classifier. For example, the aircraft fault prediction classifier 140 includes a random forest classifier. The random forest classifier reduces a likelihood of overfitting to training data of the aircraft fault prediction classifier 140 while maintaining an acceptable complexity and classification speed.

In a particular implementation, the method 500 further includes training a probability predictor to determine the probability associated with each feature vector. For example, the probability predictor 134 is trained to output probability coefficients that indicate the probability that corresponding labels of the first labels 136 are correct. Using the probability predictor 134 to determine the probabilities enables efficient determination of probabilities using machine learning techniques. In some implementations, the probability predictor 134 includes a random forest regression predictor. The random forest regression predictor reduces a likelihood of overfitting to training data of the probability predictor 134 while maintaining an acceptable level of complexity and classification speed.

In a particular implementation, the method 500 further includes refraining from relabeling feature vectors that have labels indicating the second label value or feature vectors of the subset having probabilities that satisfy the probability threshold. For example, with reference to FIG. 3, the first feature vector 302 is not relabeled because the probability 310 satisfies (e.g., is greater than or equal to) the probability threshold 330. Additionally, the third feature vector 306 and the fourth feature vector 308 are not relabeled because the feature vectors are initially labeled with the second label value (e.g., "normal"). Refraining from relabeling feature vectors that are initially labeled with the second label value reduces the number of probability comparisons that are performed, thereby improving the speed of the relabeling process.

In a particular implementation, the plurality of feature vectors include sequences of latent feature state values over a plurality of sample time periods. One latent feature state value corresponds to one sample time period. For example, the sequences of latent feature state values 202-214 are determined based on the sensor data 150. Each latent feature state value corresponds to a different time period. Determining sequences of latent feature state values reduces the size of the sensor data 150 while determining information that can be used to predict fault states. In some implementations, the method 500 includes performing a clustering operation on the sensor data to group the sensor data into the latent feature state values. For example, a clustering operation is performed on the sensor data 150 to cluster the sensor data 150 into latent feature state values. In a particular implementation, the clustering operation includes a k-Means clustering operation, a k-Medoids clustering operation, a DPGMM clustering operation, or another type of clustering operation. Clustering the sensor data 150 into clusters enables determination of relevant latent feature state values based on characteristics of and relationships within the sensor data 150. In some implementations, the latent feature state values correspond to clusters in a j-dimensional feature space, where j is the number of types of sensor variables in the sensor data. For example, by performance of the clustering operation, the sensor data 150 is reduced to clusters in the j-dimensional feature space. Reducing the sensor data 150 to clusters in the j-dimensional feature space enables determination of relevant latent feature state values based on characteristics of many variables within the sensor data 150.

In some implementations, determining a first feature vector of the plurality of feature vectors includes determining a first sequence of latent feature state values within a first set of sample time periods of a first time period. Each element of the first feature vector includes a corresponding latent feature state value of the first sequence. For example, the first sequence of latent feature state values 202 is determined for the sample time period t1-t4 in FIG. 2. A first feature vector is generated based on the first sequence of latent feature state values 202, such that a first element of the first feature vector includes the second state, a second element of the first feature vector includes the second state, a third element of the first feature vector includes the first state, and a fourth element of the first feature vector includes the third state, as illustrated in FIG. 2. In some implementations, determining a second feature vector of the plurality of feature vectors includes determining a second sequence of latent feature state values within a second set of sample time periods of a second time period that partially overlaps with the first time period. Each element of the second feature vector includes a corresponding latent feature state value of the second sequence. For example, the second sequence of latent feature state values 204 is determined for the sample time period t2-t5 in FIG. 2 (which partially overlaps with the sample time period associated with the first feature vector). A second feature vector is generated based on the second sequence of latent feature state values 204, such that a first element of the second feature vectors includes the second state, a second element of the second feature vector includes the first state, a third element of the second feature vector includes the third state, and a fourth element of the second feature vector includes the third state, as illustrated in FIG. 2. Generating the feature vectors based on temporal sequences of latent feature state values reduces a size of the information used to train the aircraft fault prediction classifier 140, as compared to using an entirety of the sensor data 150.

In a particular implementation, the method 500 further includes executing the aircraft fault prediction classifier during operation of the aircraft to generate a prompt indicating the predicted occurrence of the second fault and a particular repair associated with the predicted occurrence of the second fault. For example, execution of the aircraft fault prediction classifier 140 based on the real-time sensor data 152 can generate the prompt 162 that is displayed at the display device 106 via the GUI 160. In a particular implementation, the prompt 162 indicates a particular repair to be performed on the aircraft. For example, prior to training of the aircraft fault prediction classifier, the feature vectors can be labeled with "normal" or "precursor to a particular fault", and the aircraft fault prediction classifier 140 is trained to identify whether an input feature vector is "normal" or is a "precursor" to a corresponding type of a fault. In this example, different repairs are associated with different types of faults. Identifying a particular repair associated with a fault improves the responsiveness to the fault.

In a particular implementation, the method 500 further includes executing the aircraft fault prediction classifier during operation of the aircraft to reorganize a repair schedule based on a particular repair associated with the predicted occurrence of the second fault. For example, execution of the aircraft fault prediction classifier 140 based on the real-time sensor data 152 can reorganize the repair schedule 164 based on a repair associated with the predicted occurrence of the fault. To further illustrate, a particular repair can be prioritized when an aircraft lands to compensate for and repair the fault, thereby reducing downtime for maintenance and repairs of the aircraft. The repair schedule can be reorganized if the fault is predicted, even if the fault does not actually occur, to pre-empt a future occurrence of the fault.

In a particular implementation, receiving the input data includes receiving the sensor data and generating the plurality of feature vectors. The plurality of feature vectors include sequences of latent state feature values, and generating the plurality of feature vectors reduces the size of the sensor data. For example, the feature vectors 130 are generated based on sequences of latent feature state values. Because the feature vectors are based on clusters in a j-dimensional feature space (instead of j variables for each element), storing the feature vectors 130 uses less storage space at the memory 114 than storing an entirety of the sensor data 150.

The method 500 enables generating and training of the aircraft fault prediction classifier 140. Because the aircraft fault prediction classifier 140 is trained based on relabeled training data (e.g., the feature vectors 130 and the second labels 138, instead of the first labels 136), the aircraft fault prediction classifier 140 generates fewer false positive identifications of faults. Thus, the method 500 improves utility of the aircraft fault prediction classifier 140.

In some implementations, the method 400 of FIG. 4, the method 500 of FIG. 5, or both, are embodied as instructions stored on a computer-readable storage device. In a particular implementation, a computer-readable storage device stores instructions that, when executed by a processor, cause the processor to perform operations including receiving input data including a plurality of feature vectors. The input data includes sensor data associated with the one or more aircraft. The operations include labeling each feature vector of the plurality of feature vectors based on a temporal proximity of the feature vector to occurrence of a fault. Feature vectors that are within a threshold temporal proximity to the occurrence of the fault are labeled with a first label value and feature vectors that are not within the threshold temporal proximity to the occurrence of the fault are labeled with a second label value. The operations include determining, for each feature vector of a subset of the plurality of feature vectors, a probability that the label associated with the feature vector is correct. The subset includes feature vectors having labels that indicate the first label value. The operations include reassigning labels of one or more feature vectors of the subset, the one or more feature vectors having a probability that fails to satisfy a probability threshold. The operations further include, after reassigning the labels of the one or more feature vectors, training an aircraft fault prediction classifier using supervised training data including the plurality of feature vectors and the labels associated with the plurality of feature vectors. The aircraft fault prediction classier is configured to predict occurrence of a second fault of an aircraft using second sensor data of the aircraft. In a particular implementation, the plurality of feature vectors are based at least in part on historical data including at least some date with corresponding fault indications. For example, the sensor data 150 can include historical fault data that is pre-labeled. Alternatively, an initial labeling process is performed to determine the first labels 136. Using labeled historical data to train the aircraft fault prediction classifier 140 enables the aircraft fault prediction classifier 140 to predict faults that are identified based on sensor data from one or more flights of one or more aircraft. In another particular implementation, the second sensor data includes real-time or near real-time sensor data that is generated during operation of the aircraft. For example, the aircraft fault prediction classifier 140 is executed on the real-time sensor data 152 to predict faults of the aircraft. Using the real-time sensor data 152 as an input to the aircraft fault prediction classifier 140 enables prediction of faults during flight of the aircraft.

Figure 6:
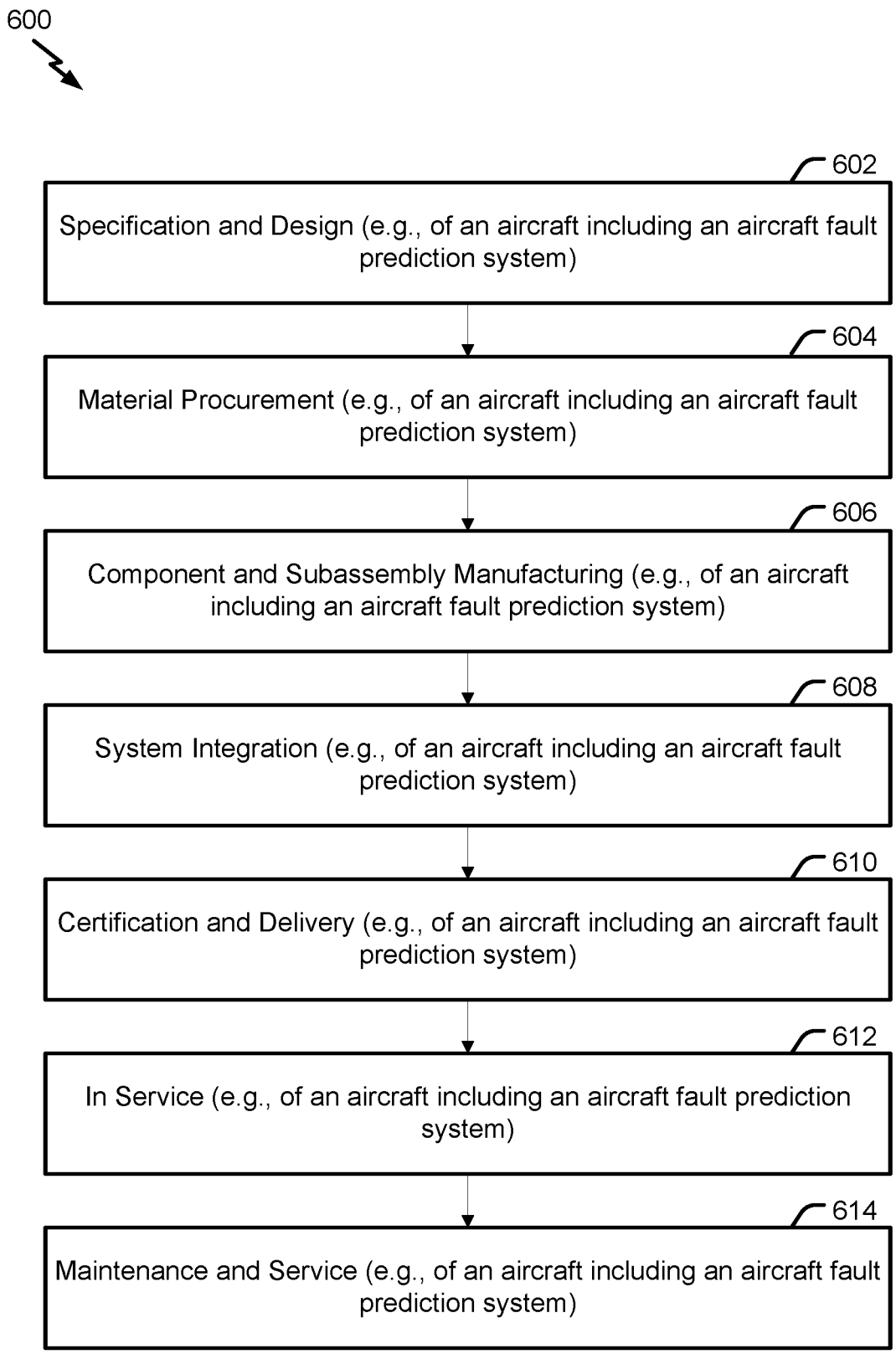
FIG. 6 is a flow chart of a method associated with an aircraft fault prediction system.
Figure 7:
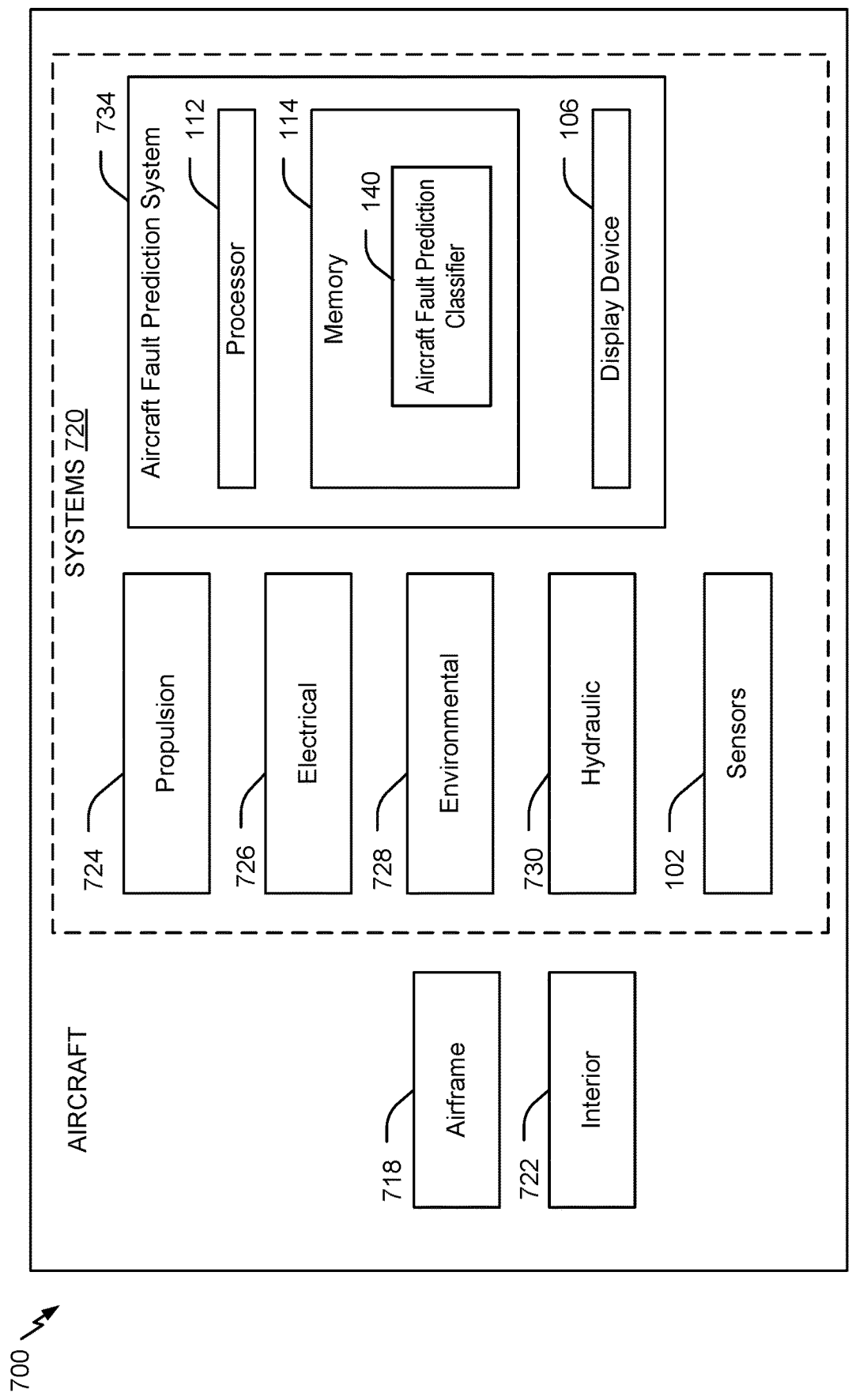
FIG. 7 is a block diagram of an aircraft including an aircraft fault prediction system.

Referring to FIGS. 6 and 7, examples of the disclosure are described in the context of a vehicle manufacturing and service method 600 as illustrated by the flow chart of FIG. 6 and a vehicle system 700 as illustrated by the block diagram of FIG. 7. A vehicle produced by the vehicle manufacturing and service method 600 of FIG. 6 and a vehicle 700 of FIG. 7 may include aircraft, an automobile, a train, a motorcycle, a bus, a ship or boat, a rocket, a spacecraft, an autonomous vehicle, or another vehicle, as illustrative, non-limiting examples.

Referring to FIG. 6, a flowchart of an illustrative example of a method associated with an aircraft fault prediction system is shown and designated 600. During pre-production, the exemplary method 600 includes, at 602, specification and design of a vehicle, such as the vehicle 700 described with reference to FIG. 7. During the specification and design of the vehicle, the method 600 includes specifying one or more sensors, a processor, a memory, a display device, or a combination thereof. In a particular implementation, the one or more sensors, the processor, the memory, and the display device include or correspond to the sensors 102, the processor 112, the memory 114, and the display device 106, respectively, of FIG. 1. At 604, the method 600 includes material procurement. For example, the method 600 may include procuring materials (such as the one or more sensors, the processor, the memory, the display device, or a combination thereof) for the aircraft fault prediction system.

During production, the method 600 includes, at 606, component and subassembly manufacturing and, at 608, system integration of the vehicle. In a particular implementation, the method 600 includes component and subassembly manufacturing (e.g., producing the one or more sensors, the processor, the memory, the display device, or a combination thereof) of the aircraft fault prediction system and system integration (e.g., coupling the one or more sensors to the processor) of the aircraft fault prediction system. At 610, the method 600 includes certification and delivery of the vehicle and, at 612, placing the vehicle in service. In some implementations, certification and delivery includes certifying the aircraft fault prediction system. Placing the vehicle in service can also include placing the aircraft fault prediction system in service. While in service by a customer, the vehicle may be scheduled for routine maintenance and service (which can also include modification, reconfiguration, refurbishment, and so on). At 614, the method 600 includes performing maintenance and service on the vehicle. In a particular implementation, the method 600 includes performing maintenance and service on the aircraft fault prediction system. For example, maintenance and service of the aircraft fault prediction system includes replacing one or more of the one or more sensors, the processor, the memory, the display device, or a combination thereof.

Each of the processes of the method 600 are performed or carried out by a system integrator, a third party, and/or an operator (e.g., a customer). For the purposes of this description, a system integrator includes without limitation any number of vehicle manufacturers and major-system subcontractors; a third party includes without limitation any number of venders, subcontractors, and suppliers; and an operator is an airline, leasing company, military entity, service organization, and so on.

Referring to FIG. 7, a block diagram of an illustrative implementation of a vehicle that includes components of an aircraft fault prediction system is shown and designated 700. In a particular implementation, the vehicle 700 includes an aircraft. In other implementations, the vehicle 700 includes other types of vehicles. In at least one implementation, the vehicle 700 is produced by at least a portion of the method 600 of FIG. 6. As shown in FIG. 7, the vehicle 700 includes an airframe 718 with a plurality of systems 720 and an interior 722. Examples of the plurality of systems 720 include one or more of a propulsion system 724, an electrical system 726, an environmental system 728, a hydraulic system 730, and a sensor system (e.g., the sensors 102). The sensors 102 include one or more sensors onboard the vehicle 700 and configured to generate sensor data before, during, and after operation of the vehicle 700.

The vehicle 700 also includes an aircraft fault prediction system 734. The aircraft fault prediction system 734 includes the processor 112 and the memory 114, as described with reference to FIG. 1. The processor 112 is configured to execute the aircraft fault prediction classifier 140 on real-time (or near real-time) sensor data from the sensors 102 to predict a fault of the vehicle 700. The aircraft fault prediction system 734 optionally includes the display device 106 (configured to display the GUI 160, as described with reference to FIG. 1).

Any number of other systems may be included in the vehicle 700. Although an aerospace example is shown, the present disclosure can be applied to other industries. For example, the aircraft fault prediction system 734 can be used onboard a manned or unmanned vehicle (such as a satellite, a watercraft, or a land-based vehicle), or in a building or other structure.

Apparatus and methods included herein can be employed during any one or more of the stages of the method 600 of FIG. 6. For example, components or subassemblies corresponding to production process 608 can be fabricated or manufactured in a manner similar to components or subassemblies produced while the vehicle 700 is in service, at 612 for example and without limitation. Also, one or more apparatus implementations, method implementations, or a combination thereof can be utilized during the production stages (e.g., stages 602-610 of the method 600), for example, by substantially expediting assembly of or reducing the cost of the vehicle 700. Similarly, one or more of apparatus implementations, method implementations, or a combination thereof can be utilized while the vehicle 700 is in service, at 700 for example and without limitation, to maintenance and service, at 614.

Although one or more of FIGS. 1-7 may illustrate systems, apparatuses, and/or methods according to the teachings of the disclosure, the disclosure is not limited to these illustrated systems, apparatuses, and/or methods. One or more functions or components of any of FIGS. 1-7 as illustrated or described herein may be combined with one or more other portions of another of FIGS. 1-7. For example, one or more elements of the method 500 of FIG. 5, the method 600 of FIG. 6, or a combination thereof, may be performed in combination with one or more elements of the method 500 of FIG. 5, the method 600 of FIG. 6, any combination thereof, or with other operations described herein. Accordingly, no single implementation described herein should be construed as limiting and implementations of the disclosure may be suitably combined without departing form the teachings of the disclosure. As an example, one or more operations described with reference to FIGS. 5-6 may be optional, may be performed at least partially concurrently, and/or may be performed in a different order than shown or described.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A method of generating an aircraft fault prediction classifier, the method comprising:
   receiving input data including a plurality of feature vectors, the input data including first sensor data associated with a first aircraft;
   receiving fault data indicating timing of a plurality of faults, the fault data distinct from the input data;
   labeling each feature vector of the plurality of feature vectors based on a temporal proximity of the feature vector to occurrence of a fault of the plurality of faults as indicated by the fault data, wherein feature vectors that are within a threshold temporal proximity to the occurrence of the fault are labeled with a first label value, and wherein feature vectors that are not within the threshold temporal proximity to the occurrence of the fault are labeled with a second label value;
   identifying a subset of the plurality of feature vectors and a second subset of feature vectors based on corresponding labels, wherein the subset includes feature vectors associated with labels that indicate the first label value, and wherein the second subset includes feature vectors associated with labels that indicate the second label value;
   determining, for each feature vector of the subset of the plurality of feature vectors, a probability that a label associated with the feature vector is correct, wherein probabilities that an associated label is correct are not determined for the second subset of the plurality of feature vectors, and wherein the second subset of the plurality of feature vectors is not considered in determining probabilities for the subset of the plurality of feature vectors;
   reassigning labels of one or more feature vectors of the subset, the one or more feature vectors having a probability that fails to satisfy a probability threshold;
   after reassigning the labels of the one or more feature vectors, training an aircraft fault prediction classifier using supervised training data including the plurality of feature vectors and the labels associated with the plurality of feature vectors, the aircraft fault prediction classifier configured to predict occurrence of a second fault of a second aircraft using second sensor data of the second aircraft, wherein the aircraft fault prediction classifier comprises a random forest classifier; and
   training a probability predictor comprising a random forest regression predictor distinct from the random forest classifier; and
   generating, by the probability predictor, a confidence score associated with a probability that the label associated with the feature vector is correct for each vector of the subset of the plurality of feature vectors based on an average of outputs from multiple regression decision trees.

2. The method of claim 1, wherein the fault data includes maintenance messages generated by the first aircraft, the maintenance messages indicating the timing of the plurality of faults.

3. The method of claim 1, further comprising refraining from relabeling feature vectors that have labels indicating the second label value and refraining from relabeling feature vectors of the subset having probabilities that satisfy the probability threshold.

4. The method of claim 1, wherein each feature vector of the plurality of feature vectors comprises a plurality of latent feature state values, wherein a first feature state value of a first feature vector corresponds to a plurality of data points in a time period.

5. The method of claim 4, wherein each latent feature state value of the plurality of latent feature state values corresponds to a cluster in a j-dimensional feature space, and wherein j is a number of types of sensor variables in the first sensor data.

6. The method of claim 5, further comprising:
   performing a clustering operation on the first sensor data to group the first sensor data into a plurality of clusters, wherein each cluster of the plurality of clusters is assigned a particular latent feature state value; and
   generating the one or more feature vectors based on latent feature state values associated with the plurality of clusters.

7. The method of claim 4, wherein determining the first feature vector of the plurality of feature vectors comprises determining a first sequence of latent feature state values within a first set of sample time periods of a first time period, and wherein each element of the first feature vector includes a corresponding latent feature state value of the first sequence.

8. The method of claim 1, wherein the first label value corresponds to a precursor to fault value, and wherein the second label value corresponds to a normal state value.

9. The method of claim 1, further comprising executing the aircraft fault prediction classifier during operation of the second aircraft to reorganize a repair schedule based on a particular repair associated with the predicted occurrence of the second fault.

10. The method of claim 1, wherein receiving the input data comprises receiving the first sensor data and generating the plurality of feature vectors, wherein the plurality of feature vectors comprise sequences of latent feature state values, and wherein generating the plurality of feature vectors reduces a size of the first sensor data.

11. A system comprising:
    a processor; and
    a memory coupled to the processor and storing instructions executable by the processor to perform operations comprising:
      receiving input data including a plurality of feature vectors, the input data including sensor data associated with a first aircraft;
      receiving fault data indicating timing of a plurality of faults, the fault data distinct from the input data;
      labeling each feature vector of the plurality of feature vectors based on a temporal proximity of the feature vector to occurrence of a fault of the plurality of faults as indicated by the fault data, wherein feature vectors that are within a threshold temporal proximity to the occurrence of the fault are labeled with a first label value, and wherein feature vectors that are not within the threshold temporal proximity to the occurrence of the fault are labeled with a second label value;

identifying a subset of the plurality of feature vectors and a second subset of feature vectors based on corresponding labels, wherein the subset includes feature vectors associated with labels that indicate the first label value, and wherein the second subset includes feature vectors associated with labels that indicate the second label value;

determining, for each feature vector of the subset of the plurality of feature vectors, a probability that a label associated with the feature vector is correct, wherein probabilities that an associated label is correct are not determined for the second subset of the plurality of feature vectors, and wherein the second subset of the plurality of feature vectors is not considered in determining probabilities for the subset of the plurality of feature vectors;

reassigning labels of one or more feature vectors of the subset, the one or more feature vectors having a probability that fails to satisfy a probability threshold;

after reassigning the labels of the one or more feature vectors, training an aircraft fault prediction classifier using supervised training data including the plurality of feature vectors and the labels associated with the plurality of feature vectors, the aircraft fault prediction classifier configured to predict occurrence of a second fault of a second aircraft using second sensor data of the second aircraft, wherein the aircraft fault prediction classifier comprises a random forest classifier; and training a probability predictor comprising a random forest regression predictor distinct from the random forest classifier; and generating, by the probability predictor, a confidence score associated with a probability that the label associated with the feature vector is correct for each vector of the subset of the plurality of feature vectors based on an average of outputs from multiple regression decision trees.

12. The system of claim 11, wherein the plurality of feature vectors include sequences of latent feature state values over a plurality of sample time periods, wherein each latent feature state corresponds to a sample time period, and wherein the latent feature state values correspond to a cluster in a feature space.

13. The system of claim 11, wherein a first feature vector of the one or more feature vectors includes a first value corresponding to a first time and a second value corresponding to a second time, wherein a second feature vector of the one or more feature vectors includes the second value corresponding to the second time and a third value corresponding to a third time, wherein the first feature vector does not include the third value, and wherein the second feature vector does not include the first feature vector.

14. The system of claim 13, further comprising:
labeling the second feature vector with the first label value responsive to the second time and third time being within the threshold temporal proximity to the occurrence of the fault; and
labeling the first feature vector with the second label value responsive to the second time being within the threshold temporal proximity to the occurrence of the fault and the first time not being within the threshold temporal proximity to the occurrence of the fault.

15. A non-transitory computer-readable storage device storing instructions that, when executed by a processor, cause the processor to perform operations comprising:
receiving input data including a plurality of feature vectors, the input data including sensor data associated with a first aircraft;
receiving fault data indicating timing of a plurality of faults, the fault data distinct from the input data;
labeling each feature vector of the plurality of feature vectors based on a temporal proximity of the feature vector to occurrence of a fault of the plurality of faults as indicated by the fault data, wherein feature vectors that are within a threshold temporal proximity to the occurrence of the fault are labeled with a first label value, and wherein feature vectors that are not within the threshold temporal proximity to the occurrence of the fault are labeled with a second label value;
identifying a subset of the plurality of feature vectors and a second subset of feature vectors based on corresponding labels, wherein the subset includes feature vectors associated with labels that indicate the first label value, and wherein the second subset includes feature vectors associated with labels that indicate the second label value;
determining, for each feature vector of the subset of the plurality of feature vectors, a probability that a label associated with the feature vector is correct, wherein probabilities that an associated label is correct are not determined for the second subset of the plurality of feature vectors, and wherein the second subset of the plurality of feature vectors is not considered in determining probabilities for the subset of the plurality of feature vectors;
reassigning labels of one or more feature vectors of the subset, the one or more feature vectors having a probability that fails to satisfy a probability threshold;
after reassigning the labels of the one or more feature vectors, training an aircraft fault prediction classifier using supervised training data including the plurality of feature vectors and the labels associated with the plurality of feature vectors, the aircraft fault prediction classifier configured to predict occurrence of a second fault of a second aircraft using second sensor data of the second aircraft, wherein the aircraft fault prediction classifier comprises a random forest classifier; and
training a probability predictor comprising a random forest regression predictor distinct from the random forest classifier; and
generating, by the probability predictor, a confidence score associated with a probability that the label associated with the feature vector is correct for each vector of the subset of the plurality of feature vectors based on an average of outputs from multiple regression decision trees.

16. The non-transitory computer-readable storage device of claim 15, wherein the plurality of feature vectors are based at least in part on historical data including at least some data with corresponding fault indications.

17. The non-transitory computer-readable storage device of claim 15, wherein the second sensor data comprises real-time or near real-time sensor data that is generated during operation of the aircraft.

18. The system of claim 11, wherein the fault data includes maintenance messages generated by the first aircraft, the maintenance messages indicating the timing of the plurality of faults.

19. The system of claim 11, wherein each feature vector of the plurality of feature vectors comprises a plurality of latent feature state values, wherein a first feature state value of a first feature vector corresponds to a plurality of data points in a time period.

20. The non-transitory computer-readable storage device of claim 15, wherein the fault data includes maintenance messages generated by the first aircraft, the maintenance messages indicating the timing of the plurality of faults.

* * * * *